United States Patent [19]

Ohki

[11] Patent Number: 5,309,527
[45] Date of Patent: May 3, 1994

[54] IMAGE DATA PROCESSING APPARATUS

[75] Inventor: Mitsuharu Ohki, Tokyo, Japan

[73] Assignee: Sony Corporation, Japan

[21] Appl. No.: 820,779

[22] Filed: Jan. 15, 1992

[30] Foreign Application Priority Data

Jan. 18, 1991 [JP] Japan .................................. 3-018456

[51] Int. Cl.$^5$ .............................................. H04N 7/12
[52] U.S. Cl. ...................................... 382/56; 382/41;
358/433; 348/415; 348/384
[58] Field of Search .......................... 382/56, 27, 41;
358/433, 136, 133; 364/725, 826; H04N 7/12,
11/02

[56] References Cited

U.S. PATENT DOCUMENTS

| | | | |
|---|---|---|---|
| 4,293,920 | 10/1981 | Merola | 358/133 |
| 4,481,606 | 11/1984 | Chase | 364/719 |
| 4,791,598 | 12/1988 | Liou et al. | 364/725 |
| 4,829,465 | 5/1989 | Knauer et al. | 364/725 |
| 4,866,653 | 9/1989 | Kulisch et al. | 364/748 |
| 4,914,615 | 4/1990 | Karmarkar et al. | 364/754 |
| 5,007,100 | 4/1991 | D'Aoust et al. | 382/41 |
| 5,054,103 | 10/1991 | Yasuda | 382/56 |
| 5,126,962 | 6/1992 | Chiang | 382/56 |

FOREIGN PATENT DOCUMENTS

| | | |
|---|---|---|
| 375868 | 3/1991 | Japan . |
| 3102567 | 4/1991 | Japan . |
| 3186969 | 8/1991 | Japan . |
| 2205710A | 12/1988 | United Kingdom . |

OTHER PUBLICATIONS

Ohki, *Matrix Multiplication Circuit*, Translation of Kokai No. 3-102567, Apr. 26, 1991.

*Primary Examiner*—Joseph Mancuso
*Assistant Examiner*—Steven P. Klocinski
*Attorney, Agent, or Firm*—Ronald P. Kananen

[57] ABSTRACT

An image data processing apparatus selects and extracts the elements of a desired 8×8 matrix from four matrices in real space each having 8 rows and 8 columns and effects an inverse discrete cosine transform on the four matrices. The elements of the four matrices each of the 8 rows and 8 columns are arranged into four vectors each of 64 elements. The elements of the vectors are supplied serially to four 64-output serial-to-parallel converters, which output the elements in parallel. Data selectors then select the 64 elements of one of the vectors. Half of the selected elements are processed by a 32-element inner product processing circuit, which produces a first inner product output signal. The remaining selected elements are processed by another 32-element inner product processing circuit, which produces a second inner product output signal. The first and second inner product output signals are added into a final output signal by an adder.

10 Claims, 7 Drawing Sheets

F I G. 4
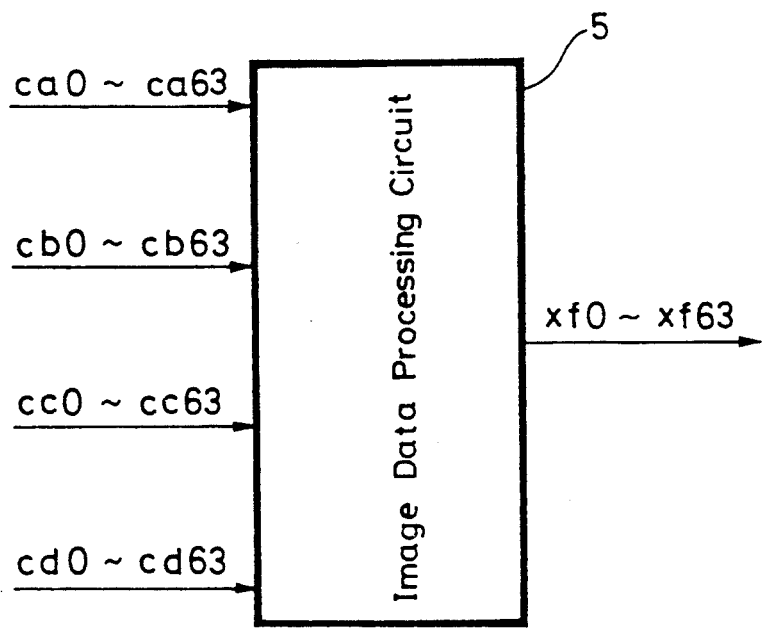

F I G. 9
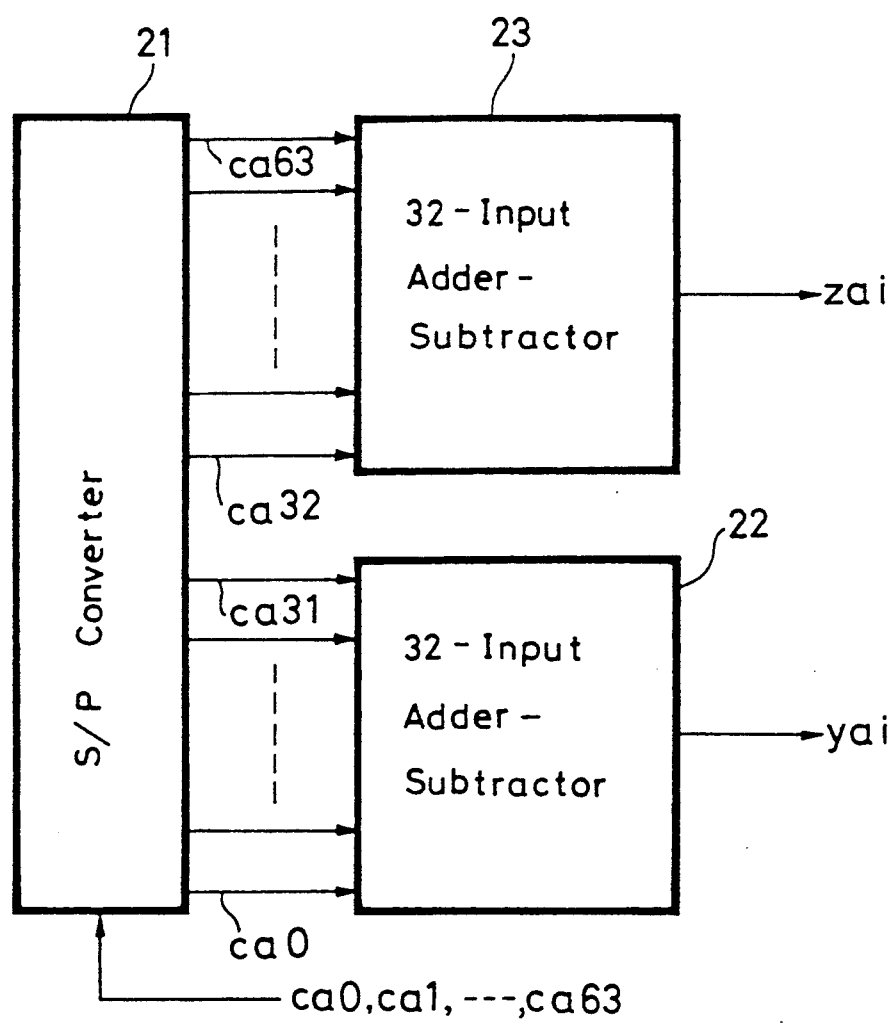

IMAGE DATA PROCESSING APPARATUS

BACKGROUND OF THE INVENTION

1. Field of the Invention:

The present invention relates to an image data processing apparatus for extracting any desired data in N rows and N columns (N is an even number of 2 or more) in a real space from four sets of data in N rows and N columns in a real space which have been produced by processing each of four sets of data in N rows and N columns in a space of spatial frequencies for an inverse discrete cosine transform.

2. Description of the Prior Art

Compressing image data for transmission often employs the discrete cosine transform (hereinafter referred to as "DCT") of two-dimensional image data arrayed in 8 rows and 8 columns, and decoding compressed image data into original image data often employs the inverse discrete cosine transform (hereinafter referred to as "IDCT") of two-dimensional image data arrayed in 8 rows and 8 columns (see, for example, Japanese Laid-Open Patent Publication No. 62-61159). In reality, a real space is divided into a number of blocks each in the form of a matrix of 8 dots × 8 dots, and each of the blocks is processed for a DCT, thereby determining DCT coefficients in a space of spatial frequencies. If it is assumed that a matrix of 8 × 8 image data in a real space with elements xi, j is indicated by X, a matrix of 8 × 8 DCT coefficients in a space of spatial frequencies with elements ci, j is indicated by C, and a transform matrix of 8 rows and 8 columns for a DCT is indicated by N, then the following equations (1) are satisfied for DCT, IDCT:

$$DCT: C = (\tfrac{1}{4})NXN^t,$$

$$IDCT: X = (\tfrac{1}{4})N^tCN \quad (1).$$

The matrices N, X, C are defined as follows:

$$N = \begin{bmatrix} r & r & r & r & r & r & r & r \\ a & b & c & d & -d & -c & -b & -a \\ \alpha & \beta & -\beta & -\alpha & -\alpha & -\beta & \beta & \alpha \\ b & -d & -a & -c & c & a & d & -b \\ r & -r & -r & r & r & -r & -r & r \\ c & -a & d & b & -b & -d & a & -c \\ \beta & -\alpha & \alpha & -\beta & -\beta & \alpha & -\alpha & \beta \\ d & -c & b & -a & a & -b & c & -d \end{bmatrix}, \text{ where } r = \frac{1}{\sqrt{2}} \quad (2)$$

$$X = \begin{bmatrix} x0,0 & x0,1 & \ldots & x0,7 \\ x1,0 & x1,1 & \ldots & x1,7 \\ \vdots & \vdots & & \vdots \\ x7,0 & x7,1 & \ldots & x7,7 \end{bmatrix},$$

$$C = \begin{bmatrix} c0,0 & c0,1 & \ldots & c0,7 \\ c1,0 & c1,1 & \ldots & c1,7 \\ \vdots & \vdots & & \vdots \\ c7,0 & c7,1 & \ldots & c7,7 \end{bmatrix}$$

In the above equations (2), $a = \cos(\pi/16)$, $\alpha = \cos(2\pi/16)$, $b = \cos(3\pi/16)$, $c = \cos(5\pi/16)$, $\beta = \cos(6\pi/16)$, $d = \cos(7\pi/16)$, and the matrix $N^t$ is a matrix transposed from the matrix N. The DCT is a linear transform from the matrix X to the matrix C, and the IDCT is a linear transform from the matrix C to the matrix X.

Specifically, as shown in FIG. 1A of the accompanying drawings, a real space is divided into a number of blocks each in the form of a matrix of 8 dots × 8 dots, and the matrices of image data in 8 rows and 8 columns, which correspond to the respective blocks, are represented by X0, X1, X2, ..., respectively. As shown in FIG. 1B of the accompanying drawings, a space of spatial frequencies, which corresponds to the real space shown in FIG. 1A, is divided into a number of blocks each in the form of a matrix of 8 dots × 8 dots, the blocks corresponding to matrices Ci. Normally, the data of the matrices Ci are successively compressed and transmitted to a receiving side, in which the received matrices Ci are successively processed for an IDCT so that they are decoded into the original matrices Xi in the real space.

For image data compression according to a DCT with motion compensation, image data is produced by shifting image data of a preceding frame by a motion vector, the produced image data is subtracted from image data of a present frame, and the resultant image data is processed for a DCT. The processed image data is then compressed and transmitted to a receiving side. In the receiving side, the transmitted image data is processed for an IDCT so that it is decoded into the image data of the present frame. To the decoded image data of the present frame, there is added image data that has been produced by shifting the decoded image data of the preceding frame by the motion vector, thereby generating an original image in a real space. When the image data which is the difference between the image data of the preceding and present frames is thus processed for a DCT for image data compression, the efficiency of image data compression is further increased. For the receiving side to decode the image data that has been compressed according to a DCT with motion compensation, it is necessary to determine, as shown in FIG. 2, the image data of a block 2 (shown hatched) that is present in a position where one divided block of 8 dots × 8 dots in a real space has been shifted by a motion vector 1.

FIG. 3 of the accompanying drawings shows a conventional image data processing apparatus for determining the image data of a block that is present in a position where a block has been shifted by a motion vector. As shown in FIG. 3, the image data processing apparatus comprises IDCT circuits 3A, 3B, 3C, 3D for effecting a two-dimensional 8 × 8 IDCT on input data, and a selector circuit 4 having four input terminals and one output terminal. Generally, a block present in a position where a block has been shifted by a motion block overlaps four blocks each composed of 8 dots × 8 dots. It is assumed that the matrices corresponding to these four blocks are represented by Xa, Xb, Xc, Xd, and the matrices in a space of spatial frequencies that have been produced by effecting a DCT on the four matrices are represented by Ca, Cb, Cc, Cd, respectively. These matrices are related with respect to an IDCT according to the following equations (3):

$$Xa = (\tfrac{1}{4})N^tCaN$$

$$Xb = (\tfrac{1}{4})N^tCbN$$

$$Xc = (\tfrac{1}{4})N^tCcN$$

$$Xd = (\tfrac{1}{4})N^TCdN \qquad (3).$$

The first IDCT circuit 3A is supplied with the 64 elements ca0,0~ca7,7 (which are actually compressed) of the first matrix Ca on the receiving side. Likewise, the second, third, and fourth IDCT circuits 3B, 3C, 3D are supplied respectively with the 64 elements cb0,0~cb7,7 of the second matrix Cb on the receiving side, the 64 elements cc0,0~cc7,7 of the third matrix Cc on the receiving side, and the 64 elements cd0,0~cd7,7 of the fourth matrix Cd on the receiving side.

The first IDCT circuit 3A supplies the selector circuit 4 with the 64 elements xa0,0~xa7,7 of the first matrix Xa in a real space which has been produced by an IDCT. Similarly, the second, third, and fourth IDCT circuits 3B, 3C, 3D supply the selector circuit 4 respectively with the 64 elements xb0,0~xb7,7 of the second matrix Xb, the 64 elements xc0,0~xc7,7 of the third matrix Xc, and the 64 elements xd0,0~xd7,7 of the fourth matrix Xd. The selector circuit 4 selects 64 elements xf0,0~xf7,7 determined according to the motion vector, from the supplied (64×4) elements, and outputs the selected 64 elements xf0,0~xf7,7.

For example, it is assumed that the image data of the block 2 is to be determined. The block 2 overlaps four blocks each composed of 8 dots×8 dots. The matrices corresponding to these four blocks are represented by X8, X9, X13, X14, respectively, and the matrices in a space of spatial frequencies which correspond to the matrices X8, X9, X13, X14 are represented by C8, C9, C13, C14, respectively. On a receiving side, the 64 elements, which are compressed, of the matrices C8, C9, C13, C14 in a space of spatial frequencies are supplied to the respective IDCT circuits 3A, 3B, 3C, 3D, and the IDCT circuits 3A, 3B, 3C, 3D supply the 64 elements of the matrices X8, X9, X13, X14 in a real space to the selector circuit 4. The selector circuit 4 then selects and outputs the 64 elements of the 8×8 matrix that corresponds to the block 2.

Generally, a matrix processing circuit for processing serially inputted 8×8 matrices and serially outputting the produced matrix requires 8 multipliers, and the IDCT calculation according to the equation (1) contains two multiplications between matrices. Therefore, the conventional two-dimensional IDCT processing circuit requires 16 (=2×8) multipliers. Inasmuch as the conventional image data processing apparatus shown in FIG. 3 has four IDCT circuits, it requires a total of 64 (4×16) multipliers. Since the circuit scale of a multiplier is considerably larger than the circuit scale of an adder or a subtractor and also since the overall circuit scale of a processing circuit composed of multipliers is determined substantially depending on the number of the multipliers used, the conventional image data processing apparatus composed of plural IDCT circuits has been relatively large in overall circuit scale.

OBJECTS AND SUMMARY OF THE INVENTION

In view of the drawbacks of the conventional image data processing apparatus, it is an object of the present invention to provide an image data processing apparatus of a relatively small circuit scale which is capable of extracting elements corresponding to one matrix from any desired position in a plurality of matrices that have been processed for an IDCT.

According to the present invention, there is provided a data processing apparatus for selectively outputting data, comprising first processing means for processing a plurality of groups of input data and outputting processed data in parallel, a plurality of data selectors for selecting data from the processed data outputted from the first processing means, and second processing means, shared by the data selectors, for processing the selected data from the data selectors.

In one preferred embodiment of the present invention, the first processing means comprises a plurality of serial-to-parallel converters for converting the respective groups of input data into parallel data, the data selectors comprising means for selecting data from the parallel data from the serial-to-parallel converters, the second processing means comprising a pair of inner product processing circuits for producing respective inner products of the selected data from respective first and second groups of the data selectors, and an adder for adding the inner products from the inner product processing circuits.

In another preferred embodiment of the present invention, the first processing means comprises a plurality of intermediate output blocks for processing the groups of input data and outputting the processed data in parallel, the data selectors comprising means for selecting data from the parallel data from the intermediate output blocks, the second processing means comprising a plurality of multipliers for producing respective products of the selected data from the data selectors and respective coefficients, and a plurality of adders for adding the products from the multipliers.

Since the second processing means is shared by the data selectors, the overall circuit scale of the data processing apparatus is relatively small.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 4 is a block diagram illustrative of the principles of the present invention;

FIG. 9 is a block diagram of a $<y>$, $<z>$ calculating block in the intermediate output block shown in FIG. 8.

DETAILED DESCRIPTION OF THE PREFERRED EMBODIMENTS

Figures 1A, 1B, 2:
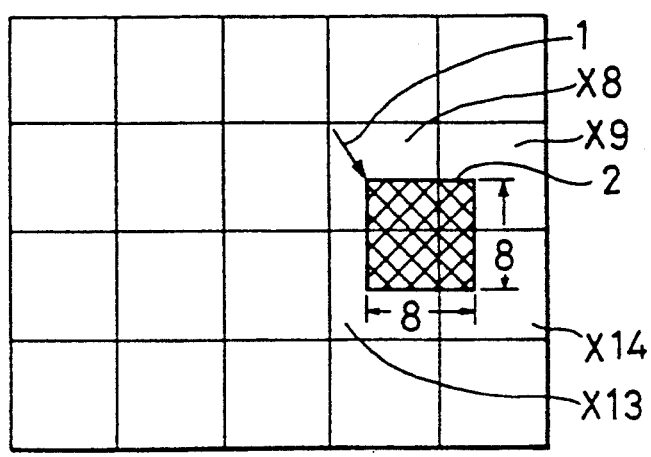
FIGS. 1A and 1B are diagrams showing blocks of a real space and a space of spatial frequencies.
FIG. 2 is a diagram of blocks of a real space.
Figure 3:
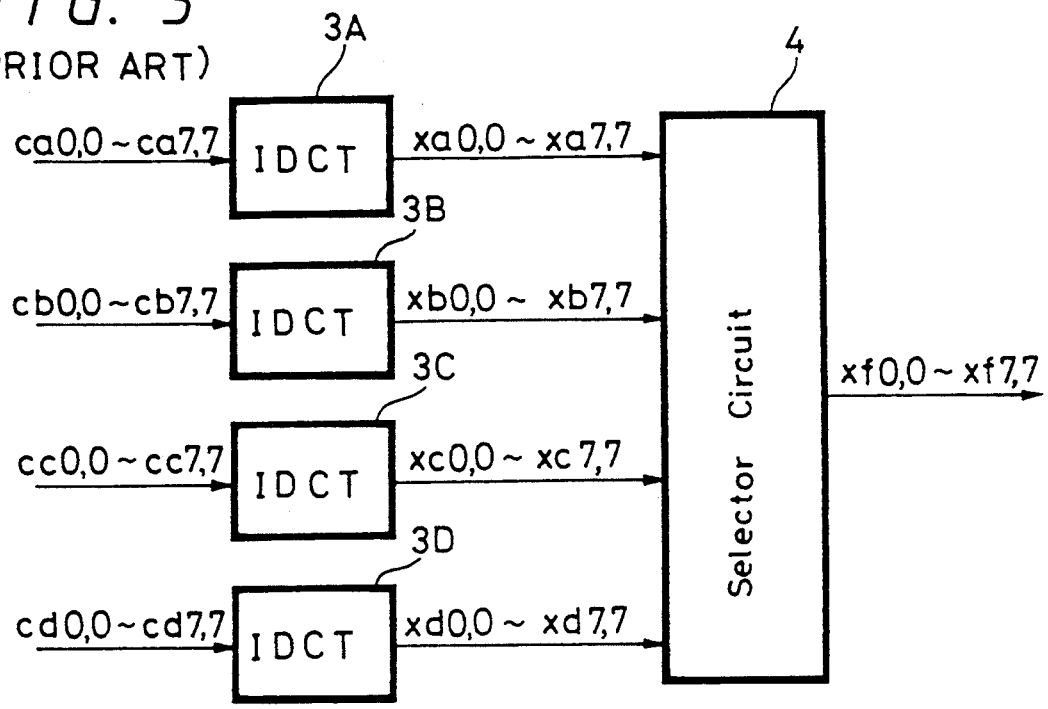
FIG. 3 is a block diagram of a conventional image data processing apparatus.

The present invention is applied to an image data processing apparatus for selecting and outputting the elements of a desired matrix Xf composed of 8 rows and 8 columns from four matrices Xa, Xb, Xc, Xd in a real space each composed of 8 rows and 8 columns, which matrices Xa, Xb, Xc, Xd have been produced by effecting an IDCT on matrices Ca, Cb, Cc, Cd in a space of spatial frequencies, each composed of 8 rows and 8 columns. Heretofore, an DCT and an IDCT are defined according to the equations (1) above. According to the present invention, a matrix X of 8 rows and 8 columns of 64 elements xi, j in a real space, as defined according to the equations (2), is transformed into a vector $<x>$ having 64 elements xk (k=0, 1, ..., 63). The elements xk of the vector $<x>$ and the elements xi, j of the matrix X correspond to each other according to an equation (3) given below. Specifically, x0=x0,0, x1=x7,7, x2=x3,3, ..., x63=x3,2.

$$\begin{bmatrix} x0 & x56 & x43 & x22 & x19 & x46 & x61 & x5 \\ x32 & x8 & x31 & x50 & x55 & x26 & x13 & x37 \\ x48 & x24 & x11 & x38 & x35 & x14 & x29 & x53 \\ x16 & x40 & x63 & x2 & x7 & x58 & x45 & x21 \\ x20 & x44 & x59 & x6 & x3 & x62 & x41 & x17 \\ x52 & x28 & x15 & x34 & x39 & x10 & x25 & x49 \\ x36 & x12 & x27 & x54 & x51 & x30 & x9 & x33 \\ x4 & x60 & x47 & x18 & x23 & x42 & x57 & x1 \end{bmatrix} = \begin{bmatrix} x0,0 & x0,1 & \ldots & x0,7 \\ x1,0 & x1,1 & \ldots & x1,7 \\ x2,0 & x2,1 & \ldots & x2,7 \\ \cdot & \cdot & & \cdot \\ \cdot & \cdot & & \cdot \\ \cdot & \cdot & & \cdot \\ x7,0 & x7,1 & \ldots & x7,7 \end{bmatrix} \quad (4)$$

Likewise, a matrix C of 8 rows and 8 columns of 64 elements ci, j in a space of spatial frequencies, as defined according to the equations (2), is transformed into a vector $<c>$ having 64 elements ck (k=0, 1, ..., 63). The elements ck of the vector $<c>$ and the elements ci, j of the matrix C correspond to each other according to an equation (5) given below. Specifically, c0=c0,0, c1=c4,4, c2=c0,4, ..., c63=c6,1.

$$\begin{bmatrix} c0 & c48 & c4 & c50 & c2 & c52 & c6 & c54 \\ c32 & c16 & c40 & c20 & c39 & c22 & c47 & c18 \\ c8 & c56 & c12 & c58 & c10 & c60 & c14 & c62 \\ c34 & c24 & c42 & c28 & c37 & c30 & c45 & c26 \\ c3 & c55 & c7 & c53 & c1 & c51 & c5 & c49 \\ c36 & c27 & c44 & c31 & c35 & c29 & c43 & c25 \\ c11 & c63 & c15 & c61 & c9 & c59 & c13 & c57 \\ c38 & c19 & c46 & c23 & c33 & c21 & c41 & c17 \end{bmatrix} = \begin{bmatrix} c0,0 & c0,1 & \ldots & c0,7 \\ c1,0 & c1,1 & \ldots & c1,7 \\ c2,0 & c2,1 & \ldots & c2,7 \\ \cdot & \cdot & & \cdot \\ \cdot & \cdot & & \cdot \\ \cdot & \cdot & & \cdot \\ c7,0 & c7,1 & \ldots & c7,7 \end{bmatrix} \quad (5)$$

Thus, the vectors $<x>$, $<c>$ can be defined as follows:

$$<x> = \begin{bmatrix} x0 \\ x1 \\ x2 \\ \cdot \\ \cdot \\ \cdot \\ x63 \end{bmatrix}, <c> = \begin{bmatrix} c0 \\ c1 \\ c2 \\ \cdot \\ \cdot \\ \cdot \\ c63 \end{bmatrix} \quad (6)$$

The above definition indicates that the two-dimensional 8×8 DCT is regarded as a linear transform from the vector $<x>$ with the 64 elements in the real space into the vector $<c>$ with the 64 elements in the space of spatial frequencies, and the two-dimensional 8×8 IDCT as a linear transform from the latter vector $<c>$ into the former vector $<x>$. If a transformation matrix of 64 rows and 64 columns for the linear transform of the DCT is indicated by M and a transformation matrix of 64 rows and 64 columns for the linear transform of the IDCT is indicated by M', then the DCT and the IDCT are defined as follows:

DCT: $<c> = M<x>$,

IDCT: $<x> = M'<c>$ (7).

Since a desired 8×8 matrix is selected and taken from four 8×8 matrices in the real space according to the present invention, it is assumed that 64-element vectors transformed from the four matrices Ca, Cb, Cc, Cd in the space of spatial frequencies according to the equation (5) are represented respectively by $<ca>$, $<cb>$, $<cc>$, and $<cd>$, and 64-element vectors transformed from the four matrices Xa, Xb, Xc, Xd in the real space according to the equation (4) are represented respectively by $<xa>$, $<xb>$, $<xc>$, and $<xd>$. As with the equations (7), these vectors $<ca>$, $<cb>$, $<cc>$, $<cd>$ and $<xa>$, $<xb>$, $<xc>$, $<xd>$ are related to each other such that one is a linear transform of the other, as indicated by the following equations:

$<xa> = M'<ca>$,
$<xb> = M'<cb>$,
$<xc> = M'<cc>$,
$<xd> = M'<cd>$ (8).

The principles of the present invention will be described below with reference to FIG. 4.

As shown in FIG. 4, an image data processing circuit 5 is supplied with the 64 elements ca0~ca63 of the vector $<ca>$, the 64 elements cb0~cb63 of the vector $<cb>$, the 64 elements cc0~cc63 of the vector $<cc>$, and the 64 elements cd0~cd63 of the vector $<cd>$. Then, the image data processing circuit 5 effects a transform according to the equations (8) on the supplied vectors $<ca>$, $<cb>$, $<cc>$, $<cd>$, producing four vectors $<xa>$, $<xb>$, $<xc>$, $<xd>$, and selects and outputs 64 elements xf0~xf63 based on a command from a control circuit (not shown). The 64 elements xf0~xf63 are transformed into a matrix of 8 rows and 8 columns according to the equation (4), thereby generating the 8×8 matrix to be processed.

Prior to describing detailed circuit arrangements, a processing method according to the present invention will be described below. First, the equation (7) for IDCT is expressed as follows:

$$\begin{bmatrix} x0 \\ x1 \\ x2 \\ \vdots \\ x63 \end{bmatrix} = \begin{bmatrix} m0,0 & \cdots & \cdots & m0,31 \\ m1,0 & \cdots & \cdots & m1,31 \\ m2,0 & \cdots & \cdots & m2,31 \\ \vdots & & & \vdots \\ m63,0 & \cdots & \cdots & m63,31 \end{bmatrix} \begin{bmatrix} c0 \\ c1 \\ \vdots \\ c31 \end{bmatrix} + \qquad (9)$$

$$\begin{bmatrix} n0,0 & \cdots & \cdots & n0,31 \\ n1,0 & \cdots & \cdots & n1,31 \\ n2,0 & \cdots & \cdots & n2,31 \\ \vdots & & & \vdots \\ n63,0 & \cdots & \cdots & n63,31 \end{bmatrix} \begin{bmatrix} c32 \\ c33 \\ \vdots \\ c63 \end{bmatrix}$$

The equation (9) expresses the vector $<c>$ according to the equations (7) as being divided into a first vector $<cA>$ composed of elements c0~c31 in the upper half of the vector $<c>$ and a second vector $<cB>$ composed of elements c32~c63 in the lower half of the vector $<c>$. The vector having 64 rows and 32 columns of elements mi, j is the lefthand half of the matrix M' according to the equations (7), and the vector having 64 rows and 32 columns of elements ni, j is the righthand half of the matrix M' according to the equations (7). When the equation (9) is resolved for the elements xi of the vector $<x>$, the following equation (10) is obtained:

$$xi = [mi,0 \; mi,1 \ldots mi,31] \begin{bmatrix} c0 \\ c1 \\ \vdots \\ c31 \end{bmatrix} + \qquad (10)$$

$$[ni,0 \; ni,1 \ldots ni,31] \begin{bmatrix} c32 \\ c33 \\ \vdots \\ c63 \end{bmatrix}, i = 0 \sim 63.$$

Vectors $<mi>$, $<ni>$, $<cA>$, and $<cB>$ are defined as described below for a simplified representation of the equation (10).

$$<mi> = \begin{bmatrix} mi,0 \\ mi,1 \\ \vdots \\ mi,31 \end{bmatrix}, <ni> = \begin{bmatrix} ni,0 \\ ni,1 \\ \vdots \\ ni,31 \end{bmatrix}, \qquad (11)$$

$$<cA> = \begin{bmatrix} c,0 \\ c,1 \\ \vdots \\ c,31 \end{bmatrix}, <cB> = \begin{bmatrix} c32 \\ c33 \\ \vdots \\ c63 \end{bmatrix}.$$

Then, using an inner product between the vectors, the equation (10) can be expressed as follows:

$$xi = <mi>\cdot<cA> + <ni>\cdot<cB> \qquad (12).$$

Similarly, if it is assumed that, in the equations (8), the ith elements of the vectors $<xa> \sim <xd>$ are indicated respectively by xai~xdi (i=0, 1, ..., 63), the upper halves of the vectors $<ca> \sim <cd>$ respectively by vectors $<caA> \sim <cdA>$, and the lower halves of the vectors $<ca> \sim <cd>$ respectively by vectors $<caB> \sim <cdB>$, then the equations (8) can be resolved and expressed respectively as follows:

$$xai = <mi>\cdot<caA> + <ni>\cdot<caB>,$$

$$xbi = <mi>\cdot<cbA> + <ni>\cdot<cbB>,$$

$$xci = <mi>\cdot<ccA> + <ni>\cdot<ccB>,$$

$$xdi = <mi>\cdot<cdA> + <ni>\cdot<cdB>.$$

Consequently, if the vectors $<mi>$ and $<ni>$ are known, then any ith elements of the vectors $<xa> \sim <xd>$ can be calculated. More precisely, the calculation of the elements of the vector $<xa>$ or the like requires a multiplication of ($\frac{1}{8}$). Since, however, the multiplication of ($\frac{1}{8}$) can be performed by a shift of three bits, it will not be described below. The matrix according to the equation (9), which is composed of the vector $<mi>$, can be resolved and expressed as follows:

$$\begin{bmatrix} m0,0 & \cdots & m0,31 \\ m1,0 & \cdots & m1,31 \\ m2,0 & \cdots & m2,31 \\ \vdots & & \vdots \\ m63,0 & \cdots & m63,31 \end{bmatrix} = \qquad (13)$$

$$1 \times P1 + r \times P2 + \alpha \times P3 + \beta \times P4.$$

where r=cos($\pi/4$), $\alpha$=cos($2\pi/16$), $\beta$=cos($6\pi/16$), and the matrices P1, P2, P3, P4 are constant matrices each of 64 rows and 32 columns according to respective equations (14) through (17) below. In the equations (14) through (17), the symbol — represents — 1. Therefore, all the elements of the matrices P1~P4 are 0, 1, or — 1, and the element mi, j (i=0, 1, ..., 63; j=0, 1, ..., 31) can be represented by adding and subtracting four coefficients of 1, r, $\alpha$, $\beta$. This means that the elements of the vector $<mi>$ can be represented by adding and subtracting these four coefficients.

$$P1 = \begin{bmatrix}
1111000000001100110000000001100 \\
1111000000001100110000000001100 \\
1111000000001100110000000001100 \\
1111000000001100110000000001100 \\
1111000000001100\text{---}0000000\text{---}00 \\
1111000000001100\text{---}0000000\text{---}00 \\
1111000000001100\text{---}0000000\text{---}00 \\
1111000000001100\text{---}0000000\text{---}00 \\
11\text{---}000000001100110000000001100 \\
11\text{---}000000001100110000000001100 \\
11\text{---}000000001100110000000001100 \\
11\text{---}000000001100110000000001100 \\
11\text{---}00000001100\text{---}0000000\text{---}00 \\
11\text{---}00000001100\text{---}0000000\text{---}00 \\
11\text{---}00000001100\text{---}0000000\text{---}00 \\
11\text{---}00000001100\text{---}0000000\text{---}00 \\
111100000000\text{---}00001\text{-}0000000000\text{-}1 \\
111100000000\text{---}00001\text{-}0000000000\text{-}1 \\
111100000000\text{---}00001\text{-}0000000000\text{-}1 \\
111100000000\text{---}00001\text{-}0000000000\text{-}1 \\
111100000000\text{---}0000\text{-}100000000001\text{-} \\
111100000000\text{---}0000\text{-}100000000001\text{-} \\
111100000000\text{---}0000\text{-}100000000001\text{-} \\
111100000000\text{---}0000\text{-}100000000001\text{-} \\
11\text{---}00000000\text{---}0000\text{-}100000000001\text{-} \\
11\text{---}00000000\text{---}0000\text{-}100000000001\text{-} \\
11\text{---}00000000\text{---}0000\text{-}100000000001\text{-} \\
11\text{---}00000000\text{---}0000\text{-}100000000001\text{-} \\
11\text{---}00000000\text{---}00001\text{-}0000000000\text{-}1 \\
11\text{---}00000000\text{---}00001\text{-}0000000000\text{-}1 \\
11\text{---}00000000\text{---}00001\text{-}0000000000\text{-}1 \\
1\text{-}1\text{-}00000000001\text{-}00001\text{-}0000\text{---}0000 \\
1\text{-}1\text{-}00000000001\text{-}00001\text{-}0000\text{---}0000 \\
1\text{-}1\text{-}00000000001\text{-}00001\text{-}0000\text{---}0000 \\
1\text{-}1\text{-}00000000001\text{-}00001\text{-}0000\text{---}0000 \\
1\text{-}1\text{-}00000000001\text{-}0000\text{-}10000110000 \\
1\text{-}1\text{-}00000000001\text{-}0000\text{-}10000110000 \\
1\text{-}1\text{-}00000000001\text{-}0000\text{-}10000110000 \\
1\text{-}1\text{-}00000000001\text{-}0000\text{-}10000110000 \\
1\text{---}10000000001\text{-}0000\text{-}10000110000 \\
1\text{---}10000000001\text{-}0000\text{-}10000110000 \\
1\text{---}10000000001\text{-}0000\text{-}10000110000 \\
1\text{---}10000000001\text{-}00001\text{-}0000\text{---}0000 \\
1\text{---}10000000001\text{-}00001\text{-}0000\text{---}0000 \\
1\text{---}10000000001\text{-}00001\text{-}0000\text{---}0000 \\
1\text{-}1\text{-}0000000000\text{-}100000011\text{-}1000000 \\
1\text{-}1\text{-}0000000000\text{-}100000011\text{-}1000000 \\
1\text{-}1\text{-}0000000000\text{-}100000011\text{-}1000000 \\
1\text{-}1\text{-}0000000000\text{-}100000011\text{-}1000000 \\
1\text{-}1\text{-}0000000000\text{-}1000000\text{---}1\text{-}000000 \\
1\text{-}1\text{-}0000000000\text{-}1000000\text{---}1\text{-}000000 \\
1\text{-}1\text{-}0000000000\text{-}1000000\text{---}1\text{-}000000 \\
1\text{---}10000000000\text{-}1000000\text{---}1\text{-}000000 \\
1\text{---}10000000000\text{-}1000000\text{---}1\text{-}000000 \\
1\text{---}10000000000\text{-}1000000\text{---}1\text{-}000000 \\
1\text{---}10000000000\text{-}100000011\text{-}1000000 \\
1\text{---}10000000000\text{-}100000011\text{-}1000000 \\
1\text{---}10000000000\text{-}100000011\text{-}1000000 \\
1\text{---}10000000000\text{-}100000011\text{-}1000000
\end{bmatrix} \quad (14)$$

$$P2 = \begin{bmatrix}
000000000001\text{-}1100001\text{-}111\text{-}110000 \\
000000000001\text{-}1100001\text{-}111\text{-}110000 \\
000000000001\text{-}1100001\text{-}111\text{-}110000 \\
000000000001\text{-}1100001\text{-}111\text{-}110000 \\
000000000001\text{-}110000\text{-}1\text{---}1\text{---}0000 \\
000000000001\text{-}110000\text{-}1\text{---}1\text{---}0000 \\
000000000001\text{-}110000\text{-}1\text{---}1\text{---}0000 \\
000000000001\text{-}110000\text{-}1\text{---}1\text{---}0000 \\
000000000000\text{-}1\text{---}0000\text{-}1\text{---}1\text{---}0000 \\
000000000000\text{-}1\text{---}0000\text{-}1\text{---}1\text{---}0000 \\
000000000000\text{-}1\text{---}0000\text{-}1\text{---}1\text{---}0000 \\
000000000000\text{-}1\text{---}0000\text{-}1\text{---}1\text{---}0000 \\
000000000000\text{-}1\text{---}00001\text{-}111\text{-}110000 \\
000000000000\text{-}1\text{---}00001\text{-}111\text{-}110000 \\
000000000000\text{-}1\text{---}00001\text{-}111\text{-}110000 \\
000000000000\text{-}1\text{---}00001\text{-}111\text{-}110000 \\
000000000000\text{-}1\text{---}00001\text{---}\text{-}1110000 \\
000000000000\text{-}1\text{---}00001\text{---}\text{-}1110000 \\
000000000000\text{-}1\text{---}00001\text{---}\text{-}1110000 \\
000000000000\text{-}1\text{---}00001\text{---}\text{-}1110000 \\
000000000000\text{-}1\text{---}0000\text{-}1111\text{---}0000 \\
000000000000\text{-}1\text{---}0000\text{-}1111\text{---}0000 \\
000000000000\text{-}1\text{---}0000\text{-}1111\text{---}0000 \\
000000000000\text{-}1\text{---}0000\text{-}1111\text{---}0000 \\
000000000001\text{-}1100001\text{---}\text{-}1110000 \\
000000000001\text{-}1100001\text{---}\text{-}1110000 \\
000000000001\text{-}1100001\text{---}\text{-}1110000 \\
000000000001\text{-}1100001\text{---}\text{-}1110000 \\
000000000001\text{-}110000\text{-}1111\text{---}0000 \\
000000000001\text{-}110000\text{-}1111\text{---}0000 \\
000000000001\text{-}110000\text{-}1111\text{---}0000 \\
000000000001\text{-}110000\text{-}1111\text{---}0000 \\
000000000001\text{---}\text{-}111\text{-}00000000\text{---}1\text{-} \\
000000000001\text{---}\text{-}111\text{-}00000000\text{---}1\text{-} \\
000000000001\text{---}\text{-}111\text{-}00000000\text{---}1\text{-} \\
000000000001\text{---}\text{-}111\text{-}00000000\text{---}1\text{-} \\
000000000001\text{---}\text{---}\text{-}10000000011\text{-}1 \\
000000000001\text{---}\text{---}\text{-}10000000011\text{-}1 \\
000000000001\text{---}\text{---}\text{-}10000000011\text{-}1 \\
000000000001\text{---}\text{---}\text{-}10000000011\text{-}1 \\
000000000000\text{-}111111\text{-}00000000\text{---}1\text{-} \\
000000000000\text{-}111111\text{-}00000000\text{---}1\text{-} \\
000000000000\text{-}111111\text{-}00000000\text{---}1\text{-} \\
000000000000\text{-}111111\text{-}00000000\text{---}1\text{-} \\
000000000000\text{-}111\text{---}10000000011\text{-}1 \\
000000000000\text{-}111\text{---}10000000011\text{-}1 \\
000000000000\text{-}111\text{---}10000000011\text{-}1 \\
000000000000\text{-}111\text{---}10000000011\text{-}1 \\
000000000000\text{-}11111\text{-}100000000\text{---}1 \\
000000000000\text{-}11111\text{-}100000000\text{---}1 \\
000000000000\text{-}11111\text{-}100000000\text{---}1 \\
000000000000\text{-}11111\text{-}100000000\text{---}1 \\
000000000000\text{-}111\text{---}1\text{-}00000000111\text{-} \\
000000000000\text{-}111\text{---}1\text{-}00000000111\text{-}
\end{bmatrix} \quad (15)$$

$$P_3 = \begin{Bmatrix}
000000000000\text{-}111\text{---}1\text{-}00000000111\text{-} \\
000000000000\text{-}111\text{---}1\text{-}00000000111\text{-} \\
0000000000001\text{---}11\text{-}100000000\text{----}1 \\
0000000000001\text{----}11\text{-}100000000\text{----}1 \\
0000000000001\text{----}11\text{-}100000000\text{----}1 \\
0000000000001\text{----}11\text{-}100000000\text{----}1 \\
0000000000001\text{------}1\text{-}00000000111\text{-} \\
0000000000001\text{------}1\text{-}00000000111\text{-} \\
0000000000001\text{------}1\text{-}00000000111\text{-} \\
0000000000001\text{------}1\text{-}00000000111\text{-} \\
\\
00001111111100001\text{-}00110011000011 \\
00001111111100001\text{-}00110011000011 \\
0000\text{--------}0000\text{-}100\text{--}00\text{--}0000\text{--} \\
0000\text{--------}0000\text{-}100\text{--}00\text{--}0000\text{--} \\
0000111111110000\text{-}100\text{--}00\text{--}0000\text{--} \\
0000111111110000\text{-}100\text{--}00\text{--}0000\text{--} \\
0000\text{--------}00001\text{-}00110011000011 \\
0000\text{--------}00001\text{-}00110011000011 \\
000011\text{--}11\text{-}000000\text{--}00\text{-}1001\text{--}100 \\
000011\text{--}11\text{-}000000\text{--}00\text{-}1001\text{--}100 \\
0000\text{--}11\text{--}110000011001\text{-}00\text{-}11\text{-}00 \\
0000\text{--}11\text{--}110000011001\text{-}00\text{-}11\text{-}00 \\
000011\text{--}11\text{--}000000110 01\text{-}00\text{-}11\text{-}00 \\
000011\text{--}11\text{--}000000110 01\text{-}00\text{-}11\text{-}00 \\
0000\text{--}11\text{--}11000000\text{--}00\text{-}1001\text{--}100 \\
0000\text{--}11\text{--}11000000\text{--}00\text{-}1001\text{--}100 \\
00001111\text{----}000000\text{--}001\text{-}00\text{-}1\text{-}100 \\
00001111\text{----}000000\text{--}001\text{-}00\text{-}1\text{-}100 \\
0000\text{-----}1111000000110 0\text{-}1001\text{-}1\text{-}00 \\
0000\text{----}1111000000110 0\text{-}1001\text{-}1\text{-}00 \\
00001111\text{----}0000001100\text{-}1001\text{-}1\text{-}00 \\
00001111\text{----}0000001100\text{-}1001\text{-}1\text{-}00 \\
0000\text{----}1111000000\text{-}001\text{-}00\text{-}1\text{-}100 \\
0000\text{----}1111000000\text{-}001\text{-}00\text{-}1\text{-}100 \\
000011\text{----}1100001\text{-}00\text{--}00\text{--}000011 \\
000011\text{----}1100001\text{-}00\text{--}00\text{--}000011 \\
0000\text{---}1111\text{--}0000\text{-}1001100110000\text{--} \\
0000\text{-}1111\text{--}0000\text{-}1001100110000\text{--} \\
000011\text{-----}110000\text{-}1001100110000\text{--} \\
000011\text{-----}110000\text{-}1001100110000\text{--} \\
0000\text{-}1111\text{--}00001\text{-}00\text{--}00\text{--}000011 \\
0000\text{-}1111\text{--}00001\text{-}00\text{--}00\text{--}000011 \\
00001\text{-}1\text{-}1\text{-}00001\text{-}00001\text{-}001\text{-}00\text{--} \\
00001\text{-}1\text{-}1\text{-}00001\text{-}00001\text{-}001\text{-}00\text{--} \\
0000\text{-}1\text{-}1\text{-}1\text{-}10000\text{-}10000\text{-}100\text{-}10011 \\
0000\text{-}1\text{-}1\text{-}1\text{-}10000\text{-}10000\text{-}100\text{-}10011 \\
00001\text{-}1\text{-}1\text{-}0000\text{-}10000\text{-}100\text{-}10011 \\
00001\text{-}1\text{-}1\text{-}0000\text{-}10000\text{-}100\text{-}10011 \\
0000\text{-}1\text{-}1\text{-}1\text{-}100001\text{-}00001\text{-}001\text{-}00\text{--} \\
0000\text{-}1\text{-}1\text{-}1\text{-}100001\text{-}00001\text{-}001\text{-}00\text{--} \\
00001\text{--}1\text{-}11\text{-}000000\text{--}1100\text{--}001\text{-}00 \\
00001\text{--}1\text{-}11\text{-}000000\text{--}1100\text{--}001\text{-}00 \\
0000\text{-}11\text{-}1\text{--}100000011\text{---}001100\text{-}100 \\
0000\text{-}11\text{-}1\text{--}100000011\text{---}001100\text{-}100 \\
00001\text{-}1\text{-}11\text{--}00000011\text{---}001100\text{-}100 \\
00001\text{--}1\text{-}11\text{--}00000011\text{---}001100\text{-}100 \\
0000\text{-}11\text{-}1\text{--}1000000\text{--}1100\text{--}001\text{-}00 \\
0000\text{-}11\text{-}1\text{--}1000000\text{--}1100\text{--}001\text{-}00
\end{Bmatrix}$$ (16)

$$\begin{Bmatrix}
00001\text{-}1\text{--}1\text{-}1000000111100\text{---}00\text{-}100 \\
00001\text{-}1\text{--}1\text{-}1000000111100\text{---}00\text{-}100 \\
0000\text{-}1\text{-}11\text{-}1\text{-}000000\text{------}0011001\text{-}00 \\
0000\text{-}1\text{-}11\text{-}1\text{-}000000\text{------}0011001\text{-}00 \\
00001\text{-}1\text{--}1\text{-}1000000\text{-----}0011001\text{-}00 \\
00001\text{-}1\text{--}1\text{-}1000000\text{------}0011001\text{-}00 \\
0000\text{-}1\text{-}11\text{-}1\text{-}000000111100\text{---}00\text{-}100 \\
0000\text{-}1\text{-}11\text{-}1\text{-}000000111100\text{---}00\text{-}100 \\
00001\text{--}11\text{---}100001\text{-}0000\text{-}100\text{-}100\text{---} \\
00001\text{--}11\text{---}100001\text{-}0000\text{-}100\text{-}100\text{---} \\
0000\text{-}11\text{---}11\text{-}0000\text{-}100001\text{-}001\text{-}0011 \\
0000\text{-}11\text{---}11\text{-}0000\text{-}100001\text{-}001\text{-}0011 \\
00001\text{---}11\text{--}10000\text{-}100001\text{-}001\text{-}0011 \\
00001\text{---}11\text{--}10000\text{-}100001\text{-}001\text{-}0011 \\
0000\text{-}11\text{---}11\text{-}00001\text{-}0000\text{-}100\text{-}100\text{---} \\
0000\text{-}11\text{---}11\text{-}00001\text{-}0000\text{-}100\text{-}100\text{---}
\end{Bmatrix}$$

$$P_4 = \begin{Bmatrix}
00001\text{---}11\text{-}1\text{-}00000011001\text{-}00\text{-}11\text{-}00 \\
00001\text{---}11\text{-}1\text{-}00000011001\text{-}00\text{-}11\text{-}00 \\
0000\text{-}11\text{---}1\text{-}1000000\text{--}00\text{-}1001\text{--}100 \\
0000\text{-}11\text{---}1\text{-}1000000\text{--}00\text{-}1001\text{--}100 \\
00001\text{---}11\text{-}1\text{-}000000\text{--}00\text{-}1001\text{--}100 \\
00001\text{---}11\text{-}1\text{-}000000\text{--}00\text{-}1001\text{--}100 \\
0000\text{-}11\text{---}1\text{-}1000000 11001\text{-}00\text{-}11\text{-}00 \\
0000\text{-}11\text{---}1\text{-}1000000 11001\text{-}00\text{-}11\text{-}00 \\
0000\text{-}1\text{-}1\text{-}11\text{--}00001\text{-}00110011000011 \\
0000\text{-}1\text{-}1\text{-}11\text{--}00001\text{-}00110011000011 \\
00001\text{-}1\text{-}1\text{--}10000\text{-}100\text{--}00\text{--}0000\text{--} \\
00001\text{-}1\text{-}1\text{--}10000\text{-}100\text{--}00\text{--}0000\text{--} \\
0000\text{-}1\text{-}1\text{-}11\text{--}0000\text{-}100\text{--}00\text{--}0000\text{--} \\
0000\text{-}1\text{-}1\text{-}11\text{--}0000\text{-}100\text{--}00\text{--}0000\text{--} \\
00001\text{-}1\text{-}1\text{--}100001\text{-}00110011000011 \\
00001\text{-}1\text{-}1\text{--}100001\text{-}00110011000011 \\
00001\text{-}1\text{-}1\text{-}100001\text{-}00\text{--}00\text{--}000011 \\
00001\text{-}1\text{-}1\text{-}100001\text{-}00\text{--}00\text{--}000011 \\
00001\text{-}1\text{-}1\text{-}100001\text{-}00\text{--}00\text{--}000011 \\
0000\text{-}11\text{-}1\text{-}1\text{-}0000\text{-}1001100110000\text{--} \\
0000\text{-}11\text{-}1\text{-}1\text{-}0000\text{-}1001100110000\text{--} \\
00001\text{--}1\text{-}1\text{-}10000\text{-}1001100110000\text{--} \\
00001\text{-}1\text{-}1\text{-}10000\text{-}1001100110000\text{--} \\
0000\text{-}11\text{-}1\text{-}1\text{-}00001\text{-}00\text{--}00\text{--}000011 \\
0000\text{-}11\text{-}1\text{-}1\text{-}00001\text{-}00\text{--}00\text{--}000011 \\
0000\text{-}1\text{-}11\text{--}10000001100\text{-}1001\text{-}1\text{-}00 \\
0000\text{-}1\text{-}11\text{--}10000001100\text{-}1001\text{-}1\text{-}00 \\
00001\text{-}1\text{--}11\text{-}000000\text{--}001\text{-}00\text{-}1\text{-}100 \\
00001\text{-}1\text{--}11\text{-}000000\text{--}001\text{-}00\text{-}1\text{-}100 \\
0000\text{-}1\text{-}11\text{--}1000000\text{--}001\text{-}00\text{-}1\text{-}100 \\
0000\text{-}1\text{-}11\text{--}1000000\text{--}001\text{-}00\text{-}1\text{-}100 \\
00001\text{-}1\text{--}11\text{--}0000001100\text{-}1001\text{-}1\text{-}00 \\
00001\text{-}1\text{--}11\text{--}0000001100\text{-}1001\text{-}1\text{-}00 \\
000011\text{------}000000\text{-}1100\text{--}001\text{-}00 \\
000011\text{------}000000\text{-}1100\text{--}001\text{-}00 \\
0000\text{--}11111100000011\text{--}001100\text{-}100 \\
0000\text{--}11111100000011\text{--}001100\text{-}100 \\
000011\text{------}000011\text{--}001100\text{-}100 \\
000011\text{------}000011\text{--}001100\text{-}100 \\
0000\text{--}111111000000\text{--}1100\text{--}001\text{-}00 \\
0000\text{--}111111000000\text{--}1100\text{--}001\text{-}00 \\
0000\text{------}110000\text{-}10000\text{-}100\text{-}10011 \\
0000\text{------}110000\text{-}10000\text{-}100\text{-}10011
\end{Bmatrix}$$ (17)

-continued
$$\begin{bmatrix}
0000111111---00001-00001-001-00-- \\
0000111111---00001-00001-001-00-- \\
0000-------1100001-00001-001-00-- \\
\\
0000-------1100001-00001-001-00-- \\
0000111111---0000-10000-100-10011 \\
0000111111---0000-10000-100-10011 \\
\\
000011-111100001-0000-100-100--- \\
000011-111100001-0000-100-100--- \\
0000--11------0000-100001-001-0011 \\
\\
0000--11------0000-100001-001-0011 \\
000011-11110000-100001-001-0011 \\
000011-11110000-100001-001-0011 \\
\\
0000--11------00001-0000-100-100--- \\
0000--11------00001-0000-100-100--- \\
0000------11-000000------0011001-00 \\
\\
0000------11-000000------0011001-00 \\
00001111---11000000111100---00-100 \\
00001111---11000000111100---00-100 \\
\\
0000------11---000000111100---00-100 \\
0000------11---000000111100---00-100 \\
00001111---11000000------0011001-00 \\
00001111---11000000------0011001-00
\end{bmatrix}$$

The matrix according to the equation (9), which is composed of the above vector $<ni>$, can be resolved and expressed as follows:

$$\begin{bmatrix} n0,0 & \cdots & n0,31 \\ n1,0 & \cdots & n1,31 \\ n2,0 & & n2,31 \\ \cdot & & \cdot \\ \cdot & & \cdot \\ \cdot & & \cdot \\ n63,0 & \cdots & n63,31 \end{bmatrix} = a \times P5 + b \times P6 + c \times P7 + d \times P8 \quad (18)$$

where $a = \cos(\pi/16)$, $b = \cos(3\pi/16)$, $c = \cos(5\pi/16)$, $d = \cos(7\pi/16)$, and the matrices P5, P6, P7, P8 are constant matrices each of 64 rows and 32 columns according to respective equations (19) through (22) below. In the equations (19) through (22), the symbol — represents $-1$. Therefore, all the elements of the matrices P5~P8 are 0, 1, or $-1$, and the element $ni,j$ ($i=0, 1, \ldots, 63$; $j=0, 1, \ldots, 31$) can be represented by adding and subtracting four coefficients of a, b, c, d. This means that the elements of the vector $<ni>$ can be represented by adding and subtracting these four coefficients. An image data processing apparatus according to the present invention is based on the fact that the elements of the vectors $<mi>$ and $<ni>$ can be represented by adding and subtracting the four coefficients.

$$\begin{bmatrix}
00111100111100000011110011110000 \\
00-----00-----000000-----00-----0000 \\
00-11-000000-11-00-11-000000-11- \\
\\
001---10000001---1001---10000001---1 \\
00-----00-----00000011110011110000 \\
001111001111000000-----00-----0000 \\
\\
001---10000001---100-11-000000-11- \\
00-11-000000-11-001---10000001---1 \\
110000---00-100---110000---00-100---
\end{bmatrix} \quad (19)$$

$$P5 = \begin{bmatrix}
---000011001-0011---000011001-0011 \\
-10000-11-001100-10000-11-001100 \\
1-00001---100--001-00001---100---00 \\
\\
---000011001-0011110000---00-100--- \\
110000---00-100------000011001-0011 \\
1-00001---100---00-10000-11-001100 \\
\\
-10000-11-0011001-00001---100---00 \\
00-11-0000001---100111100------0000 \\
001---1000000-11-00------0011110000 \\
\\
00------001111000000-11-0000001---1 \\
00111100------0000001---1000000-11- \\
001---1000000-11-00111100------0000 \\
\\
00-11-0000001---100------0011110000 \\
00111100------000000-11-0000001---1 \\
00------001111000001---1000000-11- \\
\\
1-00001-1-001100110000---001-0011 \\
-10000-1-100---00---00001100-100--- \\
110000---001-0011-10000-1-100---00 \\
\\
---00001100-100---1-00001-1-001100 \\
-10000-1-100---00110000---001-0011 \\
1-00001-1-001100---00001100-100--- \\
\\
---00001100-100------10000-1-100---00 \\
110000---001-00111-00001-1-001100 \\
1-0000-11-00---00001-1-0000001-1- \\
\\
-100001---100110000-1-1000000-1-1 \\
---0000---00-1001100---1100---110000 \\
11000011001-00---0011---0011---0000 \\
\\
-100001---1001100001-1-0000001-1-1 \\
1-0000-11-00---0000-1-1000000-1-1 \\
11000011001-00---00---1100---110000 \\
\\
---0000---00-100110011---0011---0000 \\
00---110011---00001-0000-1-1001100 \\
0011---00---110000-100001-1-00---00 \\
\\
00-1-10000001-1----0000---001-00--- \\
001-1-000000-1-11110001100-10011 \\
0011---00---110001-0000-1-1001100 \\
\\
00---110011---0000-100001-1-00---00 \\
001-1-000000-1-1----0000---001-00--- \\
00-1-10000001-1-1110001100-10011 \\
\\
1100001100-10011001-1-000000-1-1 \\
---0000---001-00---00-1-10000001-1- \\
1-0000-1-100110000---110011---0000 \\
\\
-100001-1-00---000011---00---110000 \\
---0000---001-00---001-1-000000-1-1 \\
1100001100-100110011-1-10000001-1-1 \\
\\
-100001-1-00---0000---110011---0000 \\
1-0000-1-10011000011---00---110000 \\
001-1-0000001-1-1-10000-11-00---00 \\
\\
00-1-1000001-1-100001---1001100 \\
00---1100---110000---0000---00-10011 \\
0011---0011---000011000011001-00--- \\
\\
00-1-1000001-1-11-0000-11-00---00 \\
001-1-0000001-1-1100001---1001100 \\
0011---0011---0000---0000---00-10011 \\
00---1100---1100001100001100001-00---
\end{bmatrix}$$

$$\begin{bmatrix}
110000111-00110011000011-1-001100 \\
---0000----100---00---0000----100---00 \\
1-0000-1001-00111-0000-1001-0011
\end{bmatrix} \quad (20)$$

-continued

```
      -100001-00-100——100001-00-100--
      --0000——100--00110000111-001100
      110000111-001100--0000——100—00

-100001-00-100--1-0000-1001-0011
      1-0000-1001-0011-100001-00-100—
      00-1-1001111000000-1-10011110000

001-1-00———0000001-1-00———0000
      0011--000000-11-0011--000000-11-
      00—110000001--100--110000001--1

001-1-00———000000-1-10011110000
      00-1-10011110000001-1-00———0000
      00—110000001--10011—000000-11-

0011—000000-11-00--110000001--1
      1-0000-100-100—11000011-100—00
      -100001-001-0011—0000—1-001100

—0000--1-0011001-0000-100-100—
      11000011-100--00-100001-001-0011
      -100001-001-00111100011-100—00

1-0000-100-100———0000—1-001100
      11000011-100--001-0000-100-100--
      --0000--1-001100-100001-001-0011

00--11000000-11-00-1-100———0000
      0011--0000001--1001-1-0011110000
      00-1-100———00000011—0000001--1

P6 =  001-1-001111000000--11000000-11-
      0011—0000001--100-1-100———0000
      00--11000000-11-001-1-0011110000

001-1-00111100000011--0000001--1
      00-1-100———000000--11000000-11-
      00———000000-1-11-00001-001-00--

0011110000001-1--10000-100-10011
      001--10011--0000110000--1-00--00
      00-11-00--110000--000011-1001100

0011110000001-1-1-00001-001-00--
      00———000000-1-1-10000-100-10011
      00-11-00--110000110000--1-00--00

001—10011--0000--000011-1001100
      110000——100110000———0000001-1-
      —0000111-00--00001111000000-1-1

-10000-1001-00—001--100--110000
      1-00001-00-1001100-11-0011—0000
      --0000111-00—0000———0000001-1-

110000——10011000011111000000-1-1
      1-00001-00-10011001—100--110000
      -10000-1001-00—00-11-0011—0000

00-11-0011—00001-00001-00-10011
      001--100—110000-10000-1001-00--
      00———0000001-1-110000——1001100

001111000000-1-1—0000111-00—00
      001--100--1100001-00001-00-10011
      00-11-0011—0000-10000-1001-00--

001111000000-1-1110000——1001100
      00———0000001-1——0000111-00—00
      1-00001-001-00--00———000000-1-1

-10000-100-10011001111000001-1-
      110000—1-00—00001—10011—0000
      —000011-100110000-11-00—110000

-10000-100-1001100———000000-1-1
      1-00001-001-00—0011110000001-1-
      —000011-1001100001—10011—0000
      110000—1-00—0000-11-00—110000
```

```
      1-0000-1001-00111-0000-1001-0011                  (21)
      -100001-00-100---100001-00-100--
      --0000——100--00--0000——100--00

110000111-001100110000111-001100
      -100001-00-100--1-0000-1001-0011
      1-0000-1001-0011-100001-00-100—

110000111-001100--0000——100--00
      --0000——100—00110000111-001100
      0011—000000-11-0011--000000-11-

00--110000001--100--110000001—1
      001-1-00———0000001-1-00———0000
      00-1-1001111000000-1-10011110000

00--110000001--10011--000000-11-
      0011—000000-11-00--110000001--1
      00-1-10011110000001-1-00———0000

001-1-00———000000-1-10011110000
      —0000--1-0011001-0000-100-100--
      11000011-100—00-100001-001-0011

-100001-001-0011—0000—1-001100
      1-0000-100-100--11000011-100—00
      11000011-100—001-0000-100-100--

—0000--1-001100-100001-001-0011
      1-0000-100-100———0000--1-001100
      -100001-001-00111100011-100--00

00-1-100———00000011—0000001--1
      001-1-001111000000--11000000-11-
      0011—0000001—1001-1-0011110000

P7 =  00--11000000-11-00-1-100———0000
      001-1-00111100000011--0000001--1
      00-1-100———000000--11000000-11-

00--11000000-11-001-1-0011110000
      0011--0000001--100-1-100———0000
      001—10011--0000110000—1-00--00

00-11-00--110000--000011-1001100
      0011110000001-1—10000-100-10011
      00———000000-1-11-00001-001-00--

00-11-00--110000110000--1-00—00
      001--10011--0000--000011-1001100
      00———000000-1-1-10000-100-10011

0011110000001-1-1-00001-001-00--
      -10000-1001-00--001--100--110000
      1-00001-00-1001100-11-0011--0000

—0000111-00--00001111000000-1-1
      110000——100110000———0000001-1-
      1-00001-00-10011001--100--110000

-10000-1001-00—00-11-0011--0000
      110000——10011000011111000000-1-1
      —0000111-00—0000———0000001-1-

00———0000001-1-110000——1001100
      001111000000-1-1—0000111-00--00
      001—100—110000-10000-1001-00—

00-11-0011—00001-00001-00-10011
      001111000000-1-1110000——1001100
      00———0000001-1——0000111-00--00

00-11-0011—0000-10000-1001-00--
      001--100--1100001-00001-00-10011
      110000--1-00—00001--10011—0000

--000011-100110000-11-00--110000
      -10000-100-10011001111000001-1-
      1-00001-001-00--00———000000-1-1
```

-continued $$\begin{pmatrix} \text{---000011-1001100001---10011---0000} \\ \text{110000---1-00---0000-11-00---110000} \\ \text{1-00001-001-00---0011110000001-1-} \\ \text{-10000-100-1001100------000000-1-1} \end{pmatrix}$$

$$P8 = \begin{pmatrix}
001---10000001---1001---10000001---1 \\
00-11-000000-11-00-11-000000-11- \\
001111001111000000111100111110000 \\
\\
00------00------000000------00------0000 \\
00-11-000000-11-001---10000001---1 \\
001---10000001---100-11-000000-11- \\
\\
00------00------000000111110011110000 \\
001111001111000000------00------0000 \\
1-00001---100---001-00001---100---00 \\
\\
-10000-11-001100-10000-11-001100 \\
110000---00-100---110000---00-100-- \\
---000011001-0011---000011001-0011 \\
\\
-10000-11-0011001-00001---100---00 \\
1-00001---100---00-10000-11-001100 \\
---000011001-0011110000---00-100-- \\
\\
110000---00-100------000011001-0011 \\
00111100------0000001---1000000-11- \\
00------001111000000-11-0000001---1 \\
\\
00-11-0000001---100111100------0000 \\
001---1000000-11-00------0011110000 \\
00------001111000001---1000000-11- \\
\\
00111100------000000-11-0000001---1 \\
001---1000000-11-00111100------0000 \\
00-11-0000001---100------0011110000 \\
\\
---00001100-100---1-00001-1-001100 \\
110000---001-0011-10000-1-100---00 \\
1-00001-1-001100110000---001-0011 \\
\\
-10000-1-100---00---00001100-100-- \\
110000---001-00111-00001-1-001100 \\
---00001100-100---10000-1-100---00 \\
\\
-10000-1-100---00110000---001-0011 \\
1-00001-1-001100---00001100-100-- \\
11000011001-00---0011---0011---0000 \\
\\
---0000---00-1001100---1100---110000 \\
1-0000-11-00---00001-1-0000001-1- \\
-100001---100110000-1-1000000-1-1 \\
\\
---0000---00-100110011---0011---0000 \\
11000011001-00---00---1100---110000 \\
-100001---1001100001-1-0000001-1- \\
\\
1-0000-11-00---0000-1-1000000-1-1 \\
001-1-000000-1-11100001100-10011 \\
00-1-10000001-1------0000---001-00-- \\
\\
00---110011---00001-0000-1-1001100 \\
0011---00---110000-100001-1-00---00 \\
00-1-10000001-1-1100001100-10011 \\
\\
001-1-000000-1-1---0000---001-00-- \\
0011---00---110000010000-1-1001100 \\
00---110011---0000001-1-00---00 \\
\\
-100001-1-00---000011---00---110000 \\
1-0000-1-100110000---110011---0000 \\
1100001100-10011001-1-000000-1-1 \\
\\
---0000---001-00---00-1-10000001-1- \\
1-0000-1-10011000011---00---110000 \\
-100001-1-00---0000---110011---0000
\end{pmatrix}$$

-continued $$\begin{pmatrix}
---0000---001-00---001-1-000000-1-1 \\
1100001100-1001100-1-10000001-1- \\
0011---0011---000011000011001-00-- \\
\\
00---1100---110000---0000---00-10011 \\
001-1-0000001-1-1-0000-11-00---00 \\
00-1-1000000-1-1-100001---1001100 \\
\\
00---1100---11000011000011001-00-- \\
0011---0011---0000---0000---00-10011 \\
00-1-1000000-1-11-0000-11-00---00 \\
001-1-0000001-1-1-100001---1001100
\end{pmatrix}$$

Figure 5:
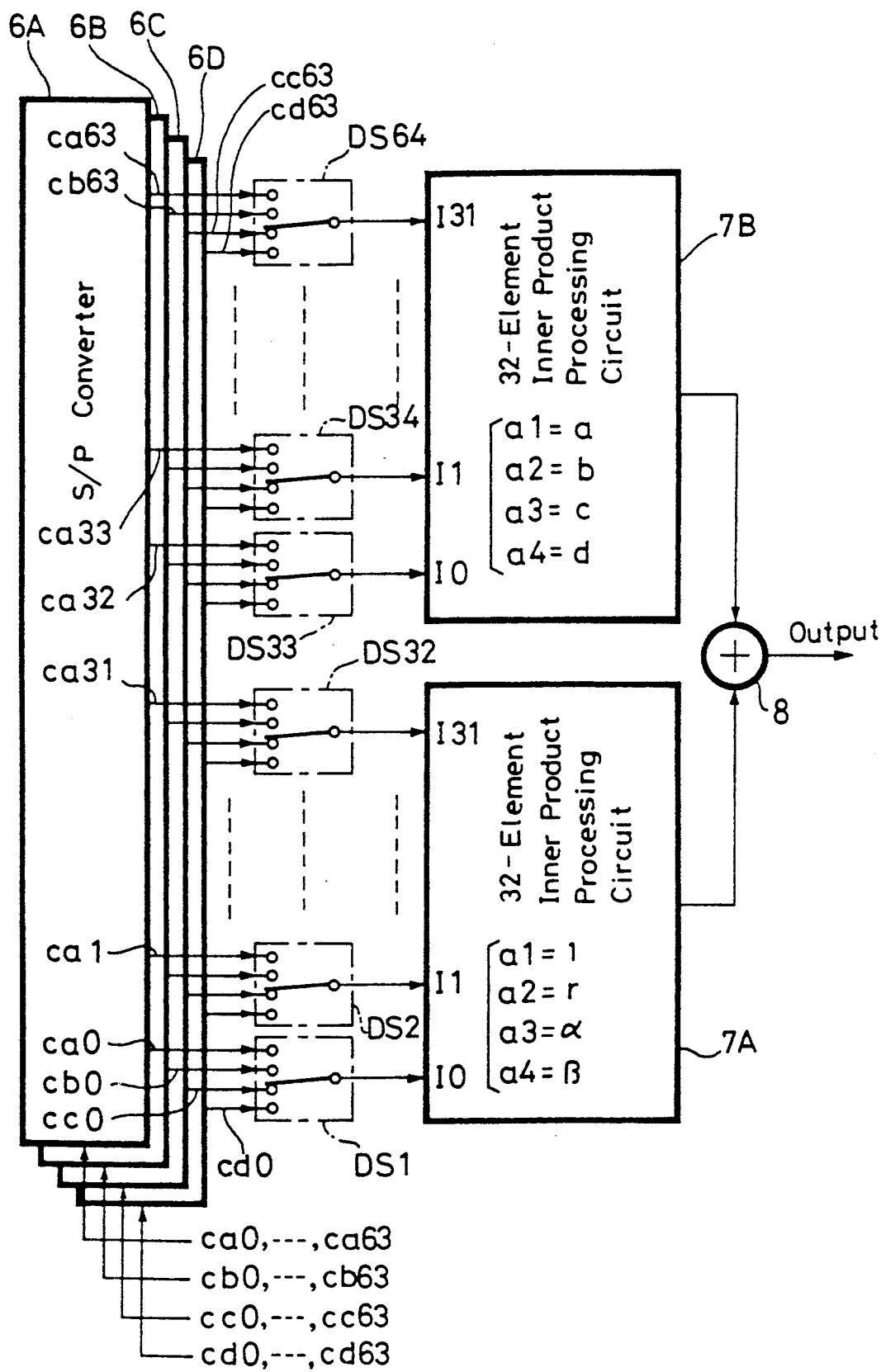
FIG. 5 is a block diagram of an image data processing apparatus according to an embodiment of the present invention.

FIG. 5 shows an image data processing apparatus according to an embodiment of the present invention. As shown in FIG. 5, the image data processing apparatus includes one-input, 64-output serial-to-parallel (S/P) converters 6A, 6B, 6C, 6D. The S/P converter 6A is supplied serially with the 64 elements ca0, ca1, ..., ca63 of a vector <ca>. The S/P converter 6B is supplied serially with the 64 elements cb0, cb1, ..., cb63 of a vector <cb>. The S/P converter 6C is supplied serially with the 64 elements cc0, cc1, ..., cc63 of a vector <cc>. The S/P converter 6D is supplied serially with the 64 elements cd0, cd1, ..., cd63 of a vector <cd>. The data of these vector elements are serially supplied to the S/P converters 6A~6D in response to synchronizing pulses whose one period is regarded as one cycle, and the S/P converters 6A~6D outputs the supplied 64 elements in parallel for successive 64 cycles.

The image data processing apparatus also has four-input, one-output data selectors DS1~DS64, a first 32-element inner product processing circuit 7A, a second 32-element inner product processing circuit 7B, and an adder 8. The first S/P converter 6A supplies the elements ca0~ca63 to respective first input terminals of the data selectors DS1~DS64. The second S/P converter 6B supplies the elements cb0~cb63 to respective second input terminals of the data selectors DS1~DS64. The third S/P converter 6C supplies the elements cc0~cc63 to respective third input terminals of the data selectors DS1~DS64. The fourth S/P converter 6D supplies the elements cd0~cd63 to respective fourth input terminals of the data selectors DS1~DS64. The data selectors DS1~DS32 supply output data to respective input terminals I0~I31 of the first inner product, processing circuit 7A, and the data selectors DS33~DS64 supply output data to respective input terminals I0~I31 of the second inner product processing circuit 7B. The inner products produced by the first and second inner product processing circuits 7A, 7B are supplied to the adder 8, which adds the supplied inner products into a final output signal.

Each of the first and second 32-element inner product processing circuits 7A, 7B will be described below with reference to FIG. 6. The inner product processing circuit includes 32-input adder-subtractors 9A~9D each having 32 input terminals. The data supplied to the input terminals I0~I31 of the inner product processing circuit are supplied in common to these 32 input terminals of the adder-subtractors 9A~9D. If it is assumed that the data supplied to the input terminals I0~I31 are represented by I0~I31, respectively, then the adder-subtractors 9A~9D produce output data that are expressed, using a set of coefficients pi (i=0, 1, ..., 31), as follows:

$$p0 \cdot I0 + p1 \cdot I1 + \ldots + p30 \cdot I30 + p31 \cdot I31.$$

The coefficients pi can be 0, 1, or −1, and the value of one set of coefficients pi varies depending on one item of output data. If the inner product processing circuit shown in FIG. 6 is the first inner product processing circuit 7A, then the set of coefficients pi in the adder-subtractor 9A varies depending on the rows of the matrix P1 according to the equation (14), and the sets of coefficients pi in the adder-subtractors 9B~9D vary depending on the rows of the matrices P2~P4 according to the equations (15)~(17). Similarly, if the inner product processing circuit shown in FIG. 6 is the second inner product processing circuit 7B, then the set of coefficients pi in the adder-subtractor 9A varies depending on the rows of the matrix P5 according to the equation (19), and the sets of coefficients pi in the adder-subtractors 9B~9D vary depending on the rows of the matrices P6~P8 according to the equations (20)~(22).

The output data from the adder-subtractors 9A~9D are supplied respectively to multipliers 10A~10D. The multiplier 10A multiplies the supplied data by a coefficient a1, the multiplier 10B multiplies the supplied data by a coefficient a2, the multiplier 10C multiplies the supplied data by a coefficient a3, and the multiplier 10D multiplies the supplied data by a coefficient a4. The products produced by the multipliers 10A~10D are added together by adders 11A~11C, thereby producing the inner product of the 32-element vectors.

Figure 6:
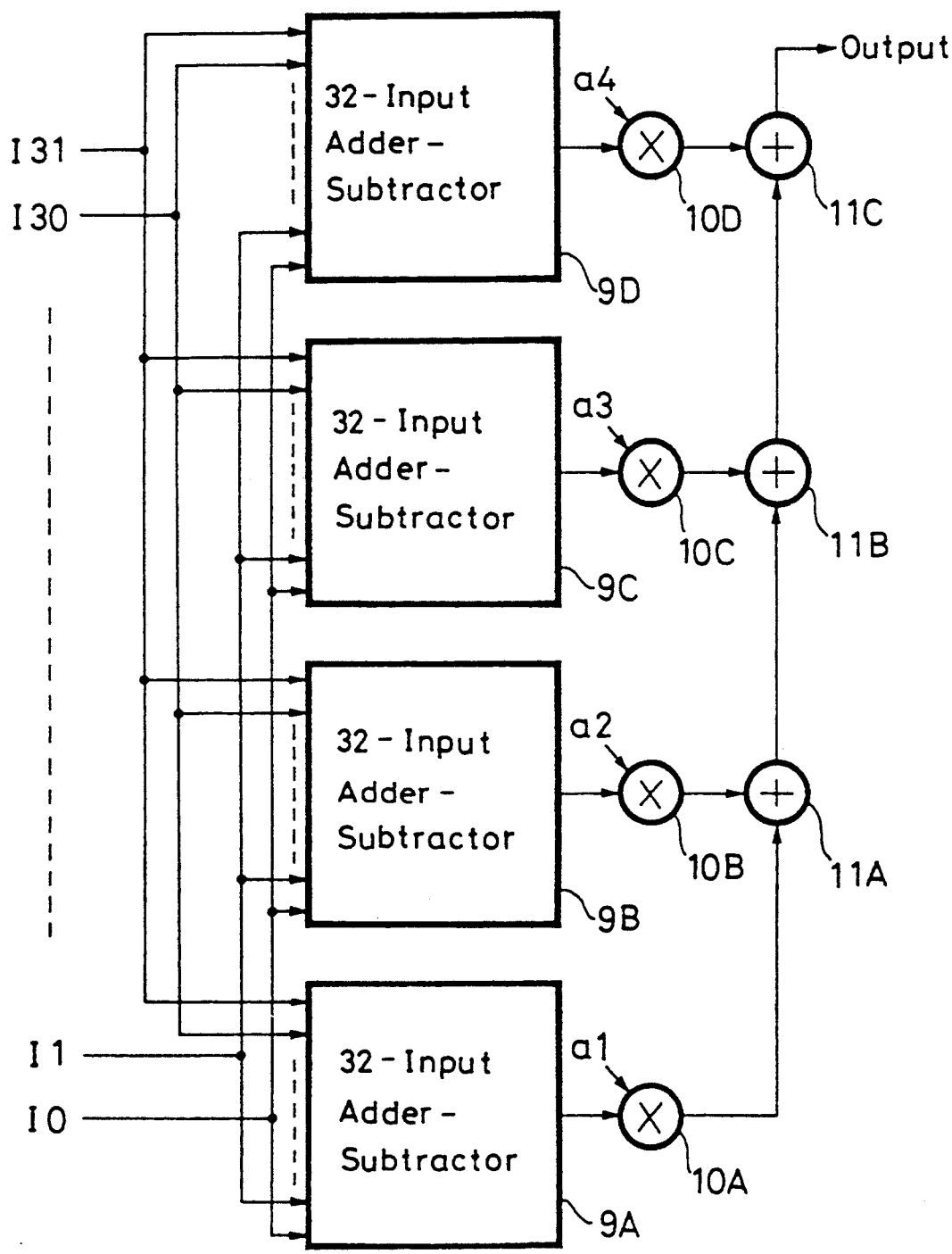
FIG. 6 is a block diagram of a 32-element inner-product processing circuit in the image data processing apparatus shown in FIG. 5.

If the inner product processing circuit shown in FIG. 6 is the first inner product processing circuit 7A, then the coefficients a1~a4 in the multipliers 10A~10D are defined, using the coefficients r, $\alpha$, $\beta$ in the equation (13), as follows:

$$a1=1, a2=r, a3=\alpha, a4=\beta.$$

Therefore, the inner product processing circuit 7A shown in FIG. 5 successively calculates the inner product between the 32-element input vector whose elements are the 32 data supplied to the input terminals I0~I31 and the 32-element vector $<mi>$ according to the equation (12).

If the inner product processing circuit shown in FIG. 6 is the second inner product processing circuit 7B, then the coefficients a1~a4 in the multipliers I0A~10D are defined, using the coefficients a, b, c, d in the equation (18), as follows:

$$a1=a, a2=b, a3=c, a4=d.$$

Therefore, the inner product processing circuit 7B shown in FIG. 5 successively calculates the inner product between the 32-element input vector whose elements are the 32 data supplied to the input terminals I0~I31 and the 32-element vector $<ni>$ according to the equation (12).

Operation of the image data processing apparatus shown in FIG. 5 will be described below.

When the control circuit (not shown) gives a command to select the vector $<ca>$, $<cb>$, $<cc>$, or $<cd>$, the data selectors DS1~DS32 supply the data from their first, second, third, or fourth input terminals to the first inner product processing circuit 7A, and the data selectors DS33~DS64 supply the data from their first, second, third, or fourth input terminals to the second inner product processing circuit 7B. For example, if the vector $<ca>$ is selected in the data selectors DS1~DS64, then the first inner product processing circuit 7A is supplied with the 32 elements of the vector $<caA>$ that is the upper half of the vector $<ca>$, and the second inner product processing circuit 7B is supplied with the 32 elements of the vector $<caB>$ that is the lower half of the vector $<ca>$. The vectors $<caA>$ and $<caB>$ can be expressed as follows:

$$<caA> = \begin{bmatrix} ca0 \\ ca1 \\ \cdot \\ \cdot \\ \cdot \\ ca31 \end{bmatrix}, <caB> = \begin{bmatrix} ca32 \\ ca33 \\ \cdot \\ \cdot \\ \cdot \\ ca63 \end{bmatrix} \quad (23)$$

Likewise, if the vectors $<cb>$, $<cc>$, $<cd>$ are selected in the data selectors DS1~DS64, then the first inner product processing circuit 7A is supplied with the vectors $<cbA>$, $<ccA>$~$<cdA>$ that are the upper halves of the selected vectors, and the second inner product processing circuit 7B is supplied with the vectors $<cbB>$, $<ccB>$, $<cdB>$ that are the lower halves of the selected vectors.

Therefore, depending on whether the vector $<ca>$, $<cb>$, $<cc>$, or $<cd>$ is selected in the data selectors DS1~DS64, the adder 8 shown in FIG. 5 outputs:

$$<mi>\cdot<caA>+<ni>\cdot<caB>(=xai),$$

$$<mi>\cdot<cbA>+<ni>\cdot<cbB>(=xbi),$$

$$<mi>\cdot<ccA>+<ni>\cdot<ccB>(=xci), \text{ or}$$

$$<mi>\cdot<cdA>+<ni>\cdot<cdB>(=xdi).$$

The value of i, indicating which element of the vector the outputted element is, can be selected as desired by varying the condition of addition and subtraction in the adder-subtractors 9A~9D shown in FIG. 6. Since the S/P converters 6A~6D shown in FIG. 1 hold the data cai~cdi during 64 cycles, the adder 8 outputs 64 elements xf0~xf63 selected out of xa0~xa63, xb0~xb63, xc0~xc63, or xd0~xd63 during the period of the 64 cycles. The outputted 64 elements are assigned to a matrix of 8 rows and 8 columns using the equation (4), thus obtaining an 8×8 matrix to be processed.

In the above embodiment, as described above, the adder 8 successively outputs the 64 elements of an 8×8 matrix (corresponding to the block 2 shown in FIG. 2) that is selected and extracted from four matrices Xa~Xb in a real space which have been produced by effecting an IDCT on four 8×8 matrices Ca~Cd in a space of spatial frequencies. As shown in FIG. 6, since each of the inner product processing circuits 7A, 7B employs four multipliers, and the inner product processing circuits 7A, 7B are shared by the matrices Ca~Cd, only 8 multipliers are employed as a whole. Inasmuch as the entire circuit scale of the image data processing apparatus is substantially proportional to the number of multipliers used, the circuit scale of the image data processing apparatus is reduced to about ⅛ of the circuit scale of the conventional image data processing apparatus which employs 64 multipliers.

An image data processing apparatus according to another embodiment of the present invention will be described below with reference to FIGS. 7 through 9. In this embodiment, the image data processing circuit selects and outputs the elements of a desired matrix Xf of 8 rows and 8 columns from four matrices Xa, Xb, Xc, Xd each composed of 8 rows and 8 columns in a real space which have been produced by effecting an IDCT on four matrices Ca, Cb, Cc, Cd each composed of 8 rows and 8 columns in a space of spatial frequencies. Furthermore, a matrix X of 8 rows and 8 columns of 64 elements xi, j in a real space defined according to the equations (2) is converted into a vector $<x>$ of 64 elements xk (k=1, 0, ..., 63) according to the equations (6), and a matrix C of 8 rows and 8 columns of 64 elements ci, j in a space of spatial frequencies defined according to the equations (2) is converted into a vector $<c>$ of 64 elements ck (k=1, 0, ..., 63) according to the equation (5).

In this embodiment, when the transformation matrix M of a DCT and the transformation matrix M' of an IDCT defined according to the equations (7) are each represented by the sum of products of matrices, the DCT and IDCT are expressed as follows:

$$DCT: <c> = (\tfrac{1}{4})(PQ + RS)<x>$$

$$IDCT: <x> = (\tfrac{1}{4})(Q^t P^t + S^t R^t)<c> \qquad (24)$$

where P, Q, R, and S are respectively constant matrices of 64 rows and 64 columns, and $P^t$, $Q^t$, $R^t$, and $S^t$ are respectively transposed matrices of matrices P, Q, R, and S. Since the transformation matrix M' is a transposed matrix of the transformation matrix M, the transformation equation (24) for the IDCT is obtained by merely transposing the matrices of the transformation equation for the DCT. Because only the equation for the IDCT among the equations (24) is employed in this embodiment, the configurations of the matrices used in the equation for the IDCT will be described below.

The matrix $Q^t$ can be expressed by the following equation (25) using the same constants r, $\alpha$, $\beta$ as used in the equations (2):

$$Q^t = \begin{bmatrix} Q1^t & & & 0 \\ & Q1^t & & \\ & & \ddots & \\ & & & \ddots \\ 0 & & & Q1^t \end{bmatrix}, \qquad (25)$$

$$Q1^t = \begin{bmatrix} 1 & r & \alpha & \beta \\ 1 & r & \alpha & \beta \\ 1 & r & -\alpha & -\beta \\ 1 & r & -\alpha & -\beta \end{bmatrix}.$$

The matrix $Q^t$ is made up of 64 rows and 64 columns, containing 16 smaller matrices $Q1^t$ each of 4 rows and 4 columns along a diagonal line inclined downwardly to the right, with only those smaller matrices $Q1^t$ having nonzero elements and the other elements being all 0. Since each of the smaller matrices $Q1^t$ contains only four elements other than 0 or $\pm 1$ in each row, the original matrix $Q^t$ and the vector of 64 elements, which are serially inputted and outputted, can be multiplied by only four multipliers.

Likewise, the matrix $S^t$ can be expressed by the following equation (26) using the same constants a, b, c, d as used in the equations (2):

$$S^t = \begin{bmatrix} S1^t & & & 0 \\ & S1^t & & \\ & & \ddots & \\ & & & \ddots \\ 0 & & & S1^t \end{bmatrix}, \qquad (26)$$

$$S1^t = \begin{bmatrix} a & d & b & c \\ -a & -d & -b & -c \\ d & -a & -c & b \\ -d & a & c & -b \end{bmatrix}.$$

The matrix $S^t$ is made up of 64 rows and 64 columns, containing 16 smaller matrices $S1^t$ each of 4 rows and 4 columns along a diagonal line inclined downwardly to the right, with only those smaller matrices $S1^t$ having nonzero elements and the other elements being all 0. Since each of the smaller matrices $S1^t$ contains only four elements other than 0 or $\pm 1$ in each row, the original matrix $S^t$ and the vector of 64 elements, which are serially inputted and outputted, can be multiplied by only four multipliers.

For the convenience of description, a matrix P instead of the matrix $P^t$ is expressed according to the equation (27) below. As is apparent from a transposition of the matrix according to the equation (27), only the 64 rows and 32 columns in the lefthand half of the matrix $P^t$ has elements of 0, 1, or $-1$, and all the elements of the 64 rows and 32 columns in the righthand half thereof are 0. In the equation (27), the symbol + represents 1, the symbol — represents $-1$, and the blank space represents 0. The same definition applies to similar equations given below. The multiplication of the matrix $P^t$ and a vector having 64 elements can therefore be carried out only by an adder-subtractor circuit.

$P =$ [large matrix of +, -, 0 entries, 32 columns, labeled (27)]

-continued
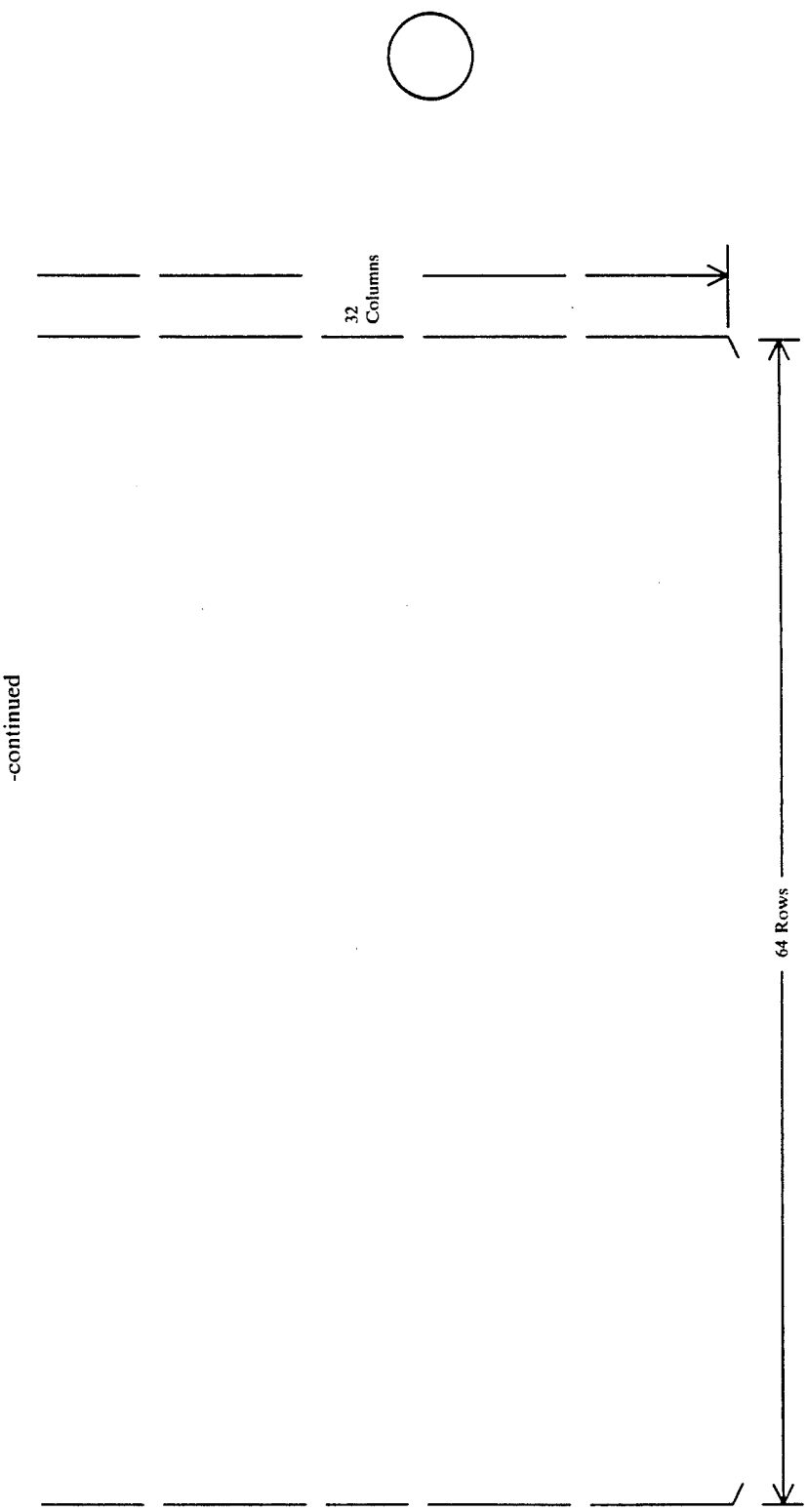

A matrix R instead of the matrix R' is expressed according to the equation (28) below. As is apparent from a transposition of the matrix according to the equation (28), all the elements of the 64 rows and 32 columns in the lefthand half of the matrix R' are 0, and the 64 rows and 32 columns in the righthand half thereof are composed of only elements of 0, 1, or −1. The multiplication of the matrix R' and a vector having 64 elements can therefore be carried out only by an adder-subtractor circuit.

$$R =$$

-continued

32 Columns

64 Rows

Consequently, if an IDCT is expressed according to the equation (24), then the IDCT can be effected on serially inputted and outputted matrices by at most eight multipliers. In this embodiment, the transformation equation (24) for the IDCT is modified as follows:

$$<x> = (1/8)(Q^t P^t + S^t R^t) <c> \quad (29)$$
$$= (1/8)(Q^t <y> + S^t <z>)$$
$$= (1/8)(<y'> + <z'>).$$

The vectors $<y>$ and $<z>$ in the equation (29) are expressed by the following equations (30), and the vectors $<y'>$ and $<z'>$ in the equation (29) are expressed by the following equations (31):

$$<y> = \begin{bmatrix} y0 \\ y1 \\ y2 \\ . \\ . \\ . \\ y63 \end{bmatrix} = P^t <c>, \quad <z> = \begin{bmatrix} z0 \\ z1 \\ z2 \\ . \\ . \\ . \\ z63 \end{bmatrix} = R^t <c>. \quad (30)$$

$$<y'> = \begin{bmatrix} y0' \\ y1' \\ y2' \\ . \\ . \\ . \\ y63' \end{bmatrix} = Q^t <y>, \quad <z'> = \begin{bmatrix} z0' \\ z1' \\ z2' \\ . \\ . \\ . \\ z63' \end{bmatrix} = S^t <z>. \quad (31)$$

The image data processing apparatus according to this embodiment also selects and extracts a desired one of four 8×8 matrices in a real space. It is assumed that 64-elements vectors produced by transforming four 8×8 matrices Ca, Cb, Cc, Cd in a space of spatial frequencies according to the equation (5) are represented by $<ca>$, $<cb>$, $<cc>$, $<cd>$, respectively, and 64-elements vectors produced by transforming four 8×8 matrices Xa, Xb, Xc, Xd in a real space according to the equation (4) are represented by $<xa>$, $<xb>$, $<xc>$, $<xd>$, respectively. These vectors are related to each other such that one is a linear transform of the other as with the equation (29). In this embodiment, an IDCT is not effected on the vectors $<ca>$, $<cb>$, $<cc>$, $<cd>$ according to the equation (29), but processing operations that require multipliers are shared as much as possible.

Basically, the processing operations according to this embodiment can be calculated in four steps described below. The multiplication of (⅛) which is required in reality can be performed by a shift of three bits, and hence will not be described below.

(Step I1) The elements of the vectors $<ca>$, $<cb>$, $<cc>$, $<cd>$ are serially inputted to determine vectors $<ya>$, $<yb>$, $<yc>$, $<yd>$ and $<za>$, $<zb>$, $<zc>$, $<zd>$ according to the equations (30).

(Step I2) One of the vectors $<ya> \sim <yd>$ is selected, and four of the 64 elements of the selected vector are selected. One of the vectors $<za> \sim <zd>$ is selected, and four of the 64 elements of the selected vector are selected.

(Step I3) The vector $<y'>$ is determined from the former four elements according to the equation (31), and the vector $<z'>$ is determined from the latter four elements according to the equation (31).

(Step I4) The calculation of $<y'>+<z'>$ is effected based on the vectors $<y'>$ and $<z'>$, thus determining a vector $<xf>$.

Figure 7:
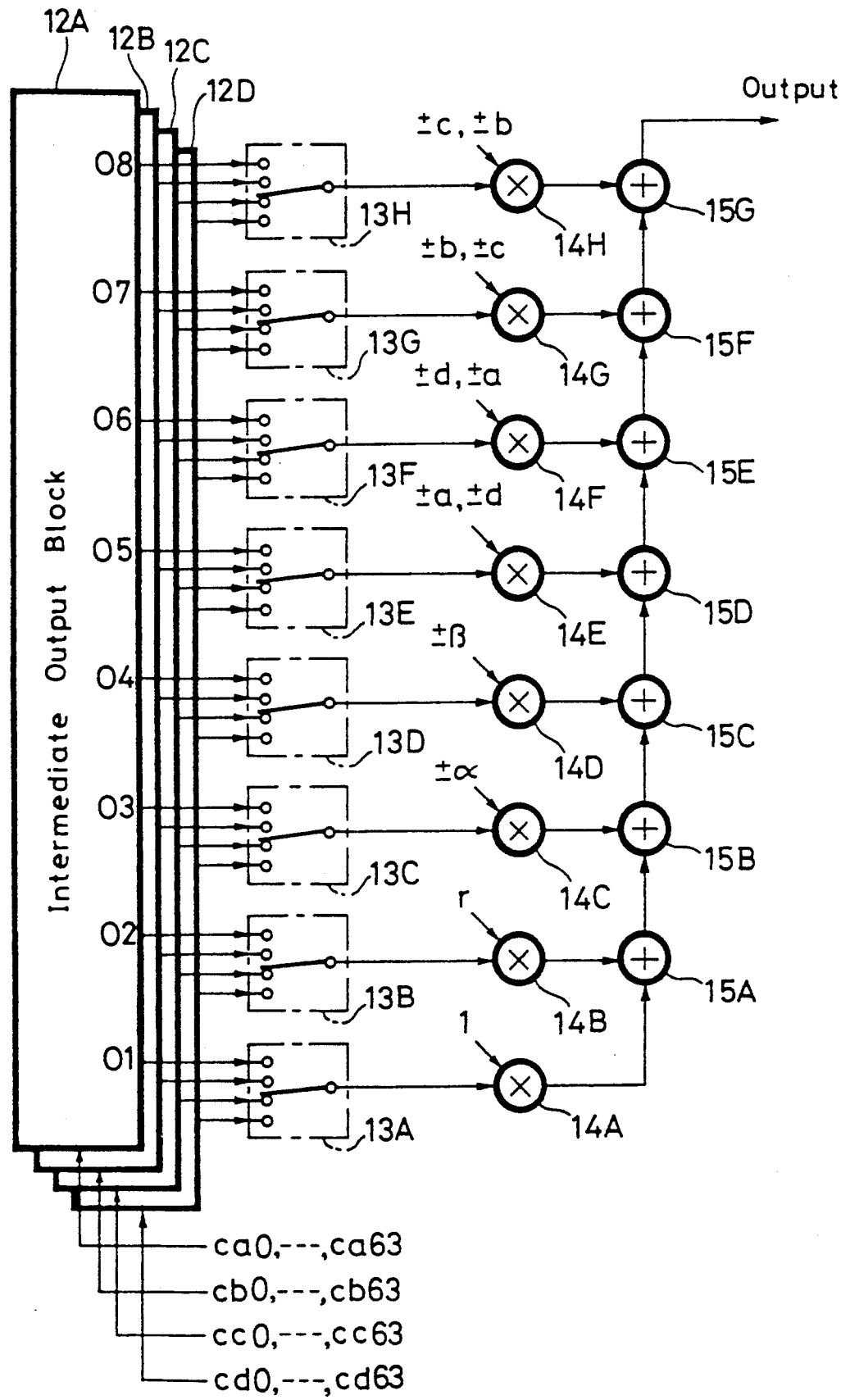
FIG. 7 is a block diagram of an image data processing apparatus according to another embodiment of the present invention.

FIG. 7 shows the image data processing apparatus according to this embodiment. As shown in FIG. 7, the image data processing apparatus includes intermediate output blocks 12A~12D each of an identical structure. The first intermediate block 12A is supplied serially with the 64 elements ca0~ca63 of a vector $<ca>$. The second intermediate block 12B is supplied serially with the 64 elements cb~cb63 of a vector $<cb>$. The third intermediate block 12C is supplied serially with the 64 elements cc0~cc63 of a vector $<cc>$. The fourth intermediate block 12D is supplied serially with the 64 elements cd0~cd63 of a vector $<cd>$.

Figure 8:
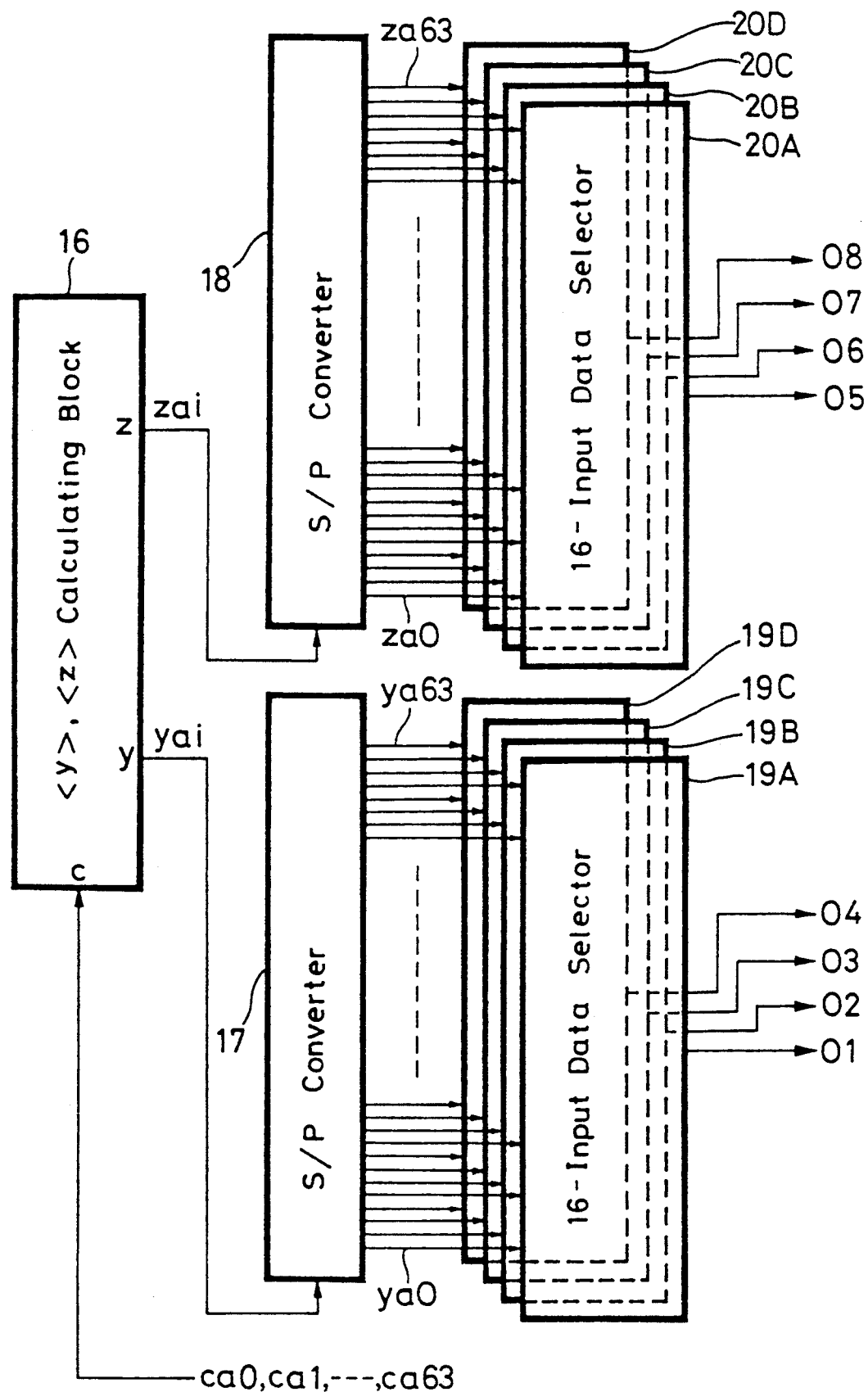
FIG. 8 is a block diagram of an intermediate output block in the image data processing apparatus shown in FIG. 7.

The first intermediate output block 12A is shown in detail in FIG. 8. The first intermediate output block 12A includes a $<y>$, $<z>$ calculating block 16 which is supplied serially with the elements ca0~ca63 of the vector $<ca>$. The $<y>$, $<z>$ calculating block 16 calculates two vectors $<ya>$, $<za>$ from the supplied elements of the vector $<ca>$, and supplies the 64 elements ya0~ya63 of the vector $<ya>$ to a one-input, 64-output serial-to-parallel (S/P) converter 17, and also supplies the 64 elements za0~za63 of the vector $<za>$ to another one-input, 64-output serial-to-parallel (S/P) converter 18. The S/P converter 17 outputs the supplied 64 elements ya0~ya63 in parallel, and the S/P converter 18 outputs the supplied 64 elements za0~za63.

FIG. 9 shows the $<y>$, $<z>$ calculating block 16 in detail. The $<y>$, $<z>$ calculating block 16 has one-input, 64-output serial-to-parallel (S/P) converter 21 which is supplied serially with the 64 elements cai in 64 cycles. The S/P converter 21 outputs data c0~c63, which are a parallel arrangement of the elements cai, continuously to its data output terminals for next 64 cycles. The $<y>$, $<z>$ calculating block 16 also has 32-input adder-subtractors 22, 23. The first 32 data c0~c31 of the 64 data from the S/P converter 21 are supplied in parallel to the adder-subtractor 22, and the last 32 data c32~c63 of the 64 data are supplied in parallel to the adder-subtractor 23. The elements of the vector $<ya>$ can be determined from the elements of the vector $<ca>$ based on the relationship of the equations (27), (30) according to to the equation (32) below. For the convenience of description, the vectors $<ca>$, $<ya>$ are represented as vectors $<c>$, $<y>$, respectively.

$$\begin{bmatrix} y0 \\ y1 \\ y2 \\ . \\ . \\ . \\ y63 \end{bmatrix} = [P1^t 0] \begin{bmatrix} c0 \\ c1 \\ c2 \\ . \\ . \\ . \\ c63 \end{bmatrix} = \quad (32)$$

-continued $$\begin{bmatrix} q0,0' & \cdots & \cdots & q0,31' \\ q1,0' & \cdots & \cdots & q1,31' \\ \cdot & & & \cdot \\ \cdot & & & \cdot \\ \cdot & & & \cdot \\ q63,0' & \cdots & \cdots & q63,31' \end{bmatrix} \begin{bmatrix} c0 \\ c1 \\ c2 \\ \cdot \\ \cdot \\ \cdot \\ c31 \end{bmatrix}$$

In the equation (32), P1' indicates a matrix composed of the 64 rows and 32 columns in the lefthand half of the transposed matrix according to the equation (27). Since the elements $q_{i,j}'$ (j=0, 1, ..., 31) of the matrix P1' are 0, 1, or −1, the elements of the vector <ya> can be determined by adding and subtracting the first 32 elements ca0~ca31 of the vector <ca>. Therefore, the adder-subtractor 22 shown in FIG. 9 serially calculates and outputs the 64 elements ya0~ya63 of the vector <ya> by performing additions and subtractions corresponding to the matrix PI'.

Likewise, based on the relationship of the equations (28) and (30), the elements of the vector <az> are determined from the elements of the vector <ca> according to the following equation (33):

$$\begin{bmatrix} z0 \\ z1 \\ z2 \\ \cdot \\ \cdot \\ \cdot \\ z63 \end{bmatrix} = [0R1'] \begin{bmatrix} c0 \\ c1 \\ c2 \\ \cdot \\ \cdot \\ \cdot \\ c63 \end{bmatrix} = \qquad (33)$$

$$\begin{bmatrix} q0,32' & \cdots & \cdots & q0,63' \\ q1,32' & \cdots & \cdots & q0,63' \\ \cdot & & & \cdot \\ \cdot & & & \cdot \\ \cdot & & & \cdot \\ q63,32' & \cdots & \cdots & q63,63' \end{bmatrix} \begin{bmatrix} c32 \\ c33 \\ c34 \\ \cdot \\ \cdot \\ \cdot \\ c63 \end{bmatrix}.$$

In the equation (33), R1' indicates a matrix composed of the 64 rows and 32 columns in the righthand half of the transposed matrix according to the equation (28). Since the elements $q_{i,j}'$ (j=32, 33, ..., 63) of the matrix R1' are 0, 1, or −1, the elements of the vector <za> can be determined by adding and subtracting the last 32 elements ca32~ca63 of the vector <ca>. Therefore, the adder-subtractor 23 shown in FIG. 9 serially calculates and the 64 elements za0~za63 of the vector <za> by performing additions and subtractions corresponding to the matrix RI'.

Referring back to FIG. 8, the first intermediate output block 12A also includes 16-input, one-output data selectors 19A~19D. The data selector 19A is supplied with 16 elements ya4i (i=0, 1, ..., 15) out of the elements ya0~ya63 that are outputted in parallel from the S/P converter 17. The data selector 19B is supplied with 16 elements ya4i+1, the data selector 19C with 16 elements ya4i+2, and the data selector 19D with 16 elements ya4i+3. In response to a command from the non-illustrated control circuit, the data selectors 19A~19D select and output those elements which are supplied to their same input terminals. Therefore, the data selectors 19A~19D output data O1~O4, respectively, which are representative of the elements ya4i, ya4i+1, ya4i+2, ya4i+3, with the value of i being set to any one of 0 through 15 according to the command from the control circuit.

The first intermediate output block 12A also includes 16-input, one-output data selectors 20A~20D. The data selectors 20A~20D are supplied with respective sets of 16 elements za4i, za4i+1, za4i+2, za4i+3 (i=0, 1, ..., 15) out of the elements za0~za63 that are outputted in parallel from the S/P converter 18. The data selectors 20A~20D select and output data O5~O8, respectively, which are representative of the elements za4i, za4i+1, za4i+2, za4i+3.

Likewise, the second intermediate output block 12B shown in FIG. 7 outputs data O1~O4, and O5~O8 representative of elements yb4j~yb4j+3 and zb4j~zb4j+3 (j=0, 1, ..., 15), respectively. The third intermediate output block 12C outputs data O1~O4, and O5~O8 representative of elements yc4k~yc4k+3 and zc4k~zc4k+3 (k=0, 1, ..., 15), respectively. The fourth intermediate output block 12D outputs data O1~O4, and O5~O8 representative of elements yd4l~yd4l+3 and zd4l~zd4l+3 (l=0, 1, ..., 15), respectively.

In FIG. 7, image data processing apparatus also includes four-input, one-output data selectors 13A~13H. The output data O1~O8 from the first intermediate output block 12A are supplied respectively to first input terminals of the data selectors 13A~13H. The output data O1~O8 from the second intermediate output block 12B are supplied respectively to second input terminals of the data selectors 13A~13H. The output data O1~O8 from the third intermediate output block 12C are supplied respectively to third input terminals of the data selectors 13A~13H. The output data O1~O8 from the fourth intermediate output block 12D are supplied respectively to fourth input terminals of the data selectors 13A~13H. In response to a command from the control circuit, the data selectors 13A~13H output the data supplied to the same input terminals from their output terminals to respective multipliers 14A~14H.

The multiplier 14A multiplies the supplied data by a coefficient 1. The multiplier 14B multiplies the supplied data by a coefficient r (r is the same as that in the equations 2). The multiplier 14C multiplies the supplied data by a coefficient α or −α. The multiplier 14D multiplies the supplied data by a coefficient β or −β. The multiplier 14E multiplies the supplied data by a coefficient a, −a, d, or −d. The multiplier 14F multiplies the supplied data by a coefficient d, −d, a, or −a. The multiplier 14G multiplies the supplied data by a coefficient b, −b, c, or −c. The multiplier 14H multiplies the supplied data by a coefficient c, −c, b, or −b. The products from the multipliers 14A~14H are added in each cycle by adders 15A~15G, and the final adder 15G serially outputs the 64 elements xfi of a vector <xf> to be processed.

Operation of the image data processing apparatus shown in FIG. 7 will be described below. The data supplied from the data selectors 13A~13H to the multipliers 14A~14H are represented by ya4j~ya4j+3 and za4j~za4j+3 (j=0, 1, ..., 15), yb4j~yb4j+3 and zb4j~zb4j+3, yc4j~yc4j+3 and zc4j~zc4j+3, or yd4j~yd4j+3 and zd4j zd4j+3. However, for the convenience of description, it is assumed that the data supplied to the multipliers 14A~14H are represented by $y_{4j} \sim y_{4j+3}$ and $z_{4j} \sim z_{4j+3}$. Based on equations (25) and (31), a vector $<y'>$ and a vector $<y>$ are related to each other as follows:

$$\begin{bmatrix} y0' \\ y1' \\ y2' \\ \cdot \\ \cdot \\ \cdot \\ y63' \end{bmatrix} = \begin{bmatrix} Q1^t & & & 0 \\ & Q1^t & & \\ & & \ddots & \\ & & & \ddots \\ 0 & & & Q1^t \end{bmatrix} \begin{bmatrix} y0 \\ y1 \\ y2 \\ \cdot \\ \cdot \\ \cdot \\ y63 \end{bmatrix} \quad (34)$$

$$Q1^t = \begin{bmatrix} 1 & r & \alpha & \beta \\ 1 & r & \alpha & \beta \\ 1 & r & -\alpha & -\beta \\ 1 & r & -\alpha & -\beta \end{bmatrix}.$$

Since the matrix according to the equation (34) contains elements which are all 0 other than 16 smaller matrices $Q1^t$ each of 4 rows and 4 columns along a diagonal line inclined downwardly to the right, the equation (34) can be expressed by the following equations (35):

$$y_{4j}' = y_{4j} + r \cdot y_{4j+1} + \alpha \cdot y_{4j+2} + \beta \cdot y_{4j+3}$$

$$y_{4j+1}' = y_{4j} + r \cdot y_{4j+1} + \alpha \cdot y_{4j+2} + \beta \cdot y_{4j+3}$$

$$y_{4j+2}' = y_{4j} + r \cdot y_{4j+1} - \alpha \cdot y_{4j+2} - \beta \cdot y_{4j+3}$$

$$y_{4j+3}' = y_{4j} + r \cdot y_{4j+1} - \alpha \cdot y_{4j+2} - \beta \cdot y_{4j+3} \quad (35).$$

In the equations (35), $j=0, 1, 2, \ldots, 15$, and the four elements $y_{4j}' \sim y_{4j+3}'$ of the vector $<y'>$ can be determined by multiplying the four elements $y_{4j} \sim y_{4j+3}$ of the vector $<y>$ by respective predetermined coefficients and adding the products. The elements $y_{4j} \sim y_{4j+3}$ are multiplied by the respective coefficients by the multipliers 14A~14D shown in FIG. 7.

Likewise, a vector $<z'>$ can be determined by multiplying a vector $<z>$ and a matrix based on the equations (26) and (31), as follows:

$$\begin{bmatrix} z0' \\ z1' \\ z2' \\ \cdot \\ \cdot \\ \cdot \\ z63' \end{bmatrix} = \begin{bmatrix} S1^t & & & 0 \\ & S1^t & & \\ & & \ddots & \\ & & & \ddots \\ 0 & & & S1^t \end{bmatrix} \begin{bmatrix} z0 \\ z1 \\ z2 \\ \cdot \\ \cdot \\ \cdot \\ z63 \end{bmatrix} \quad (36)$$

$$S1^t = \begin{bmatrix} a & d & b & c \\ -a & -d & -b & -c \\ d & -a & -c & b \\ -d & a & c & -b \end{bmatrix}.$$

Since the matrix of 64 rows and 64 columns according to the equation (36) contains elements which are all 0 other than 16 smaller matrices $S1^t$ each of 4 rows and 4 columns along a diagonal line inclined downwardly to the right, the equation (36) can be represented by the following equations (37):

$$z_{4j}' = a \cdot z_{4j} + d \cdot z_{4j+1} + b \cdot z_{4j+2} + c \cdot z_{4j+3}$$

$$z_{4j+1}' = -a \cdot z_{4j} - d \cdot z_{4j+1} - b \cdot z_{4j+2} - c \cdot z_{4j+3}$$

$$z_{4j+2}' = d \cdot z_{4j} - a \cdot z_{4j+1} - c \cdot z_{4j+2} + b \cdot z_{4j+3}$$

$$z_{4j+3}' = -d \cdot z_{4j} + a \cdot z_{4j+1} + c \cdot z_{4j+2} - b \cdot z_{4j+3} \quad (37).$$

In the equations (37), $j=0, 1, 2, \ldots, 15$, and the four elements $z_{4j}' \sim z_{4j+3}'$ of the vector $<z'>$ can be determined by multiplying the four elements $z_{4j} \sim z_{4j+3}$ of the vector $<z>$ by respective predetermined coefficients and adding the products. The elements $z_{4j} \sim z_{4j+3}$ are multiplied by the respective coefficients by the multipliers 14E~14H shown in FIG. 7.

If it is assumed that the ith element of the finally produced vector $<xf>$ is indicated by $xfi$, then the following addition is effected by the adders 14A~15G shown in FIG. 7:

$$xfi = yi' + zi' \quad (38).$$

Depending on which of vectors $<xa>$, $<xb>$, $<xc>$, and $<xd>$ the elements of the vector $<xf>$ to be finally produced belong to, the selection in the data selectors 13A~13H is changed in each cycle, and depending on which of the elements of the vector (e.g., the vector $<xa>$) they correspond to, the coefficients in the multipliers 14A~14H are changed in each cycle. In this manner, the elements of the vector $<xf>$ to be finally produced are successively outputted from the final adder 15G in respective cycles. The outputted 64 elements are assigned to the matrix of 8 rows and 8 columns according to the equation (4), thereby producing a desired 8×8 matrix in a real space.

In this embodiment, as described above, the adder 15G successively outputs the 64 elements of an 8×8 matrix (corresponding to the block 2 shown in FIG. 2) that is selected and extracted from a 16×16 matrix composed of four matrices Xa~Xb in a real space which have been produced by effecting an IDCT on four 8×8 matrices Ca~Cd in a space of spatial frequencies. As shown in FIG. 7, since the multipliers 14A and 14H are shared by the matrices Ca~Cd, only 8 multipliers are employed as a whole. Consequently, the circuit scale of the image data processing apparatus is reduced to about ¼ of the circuit scale of the conventional image data processing apparatus.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A data processing apparatus for selectively outputting data, comprising:
   first processing means for processing a plurality of groups of input data and outputting processed data in parallel;
   a plurality of data selectors for selecting data from the processed data outputted from said first processing means; and
   second processing means for processing the selected data from said data selectors;
   wherein said first processing means comprises a plurality of serial-to-parallel converters for converting the groups of input data input parallel data, said data selectors comprising means for selecting data from the parallel data from said serial-to-parallel converters, said second processing means comprising a pair of inner product processing circuits for producing respective inner products of the selected data from respective first and second groups of the data selectors, and an adder for adding the inner products from said inner product processing circuits.

2. An image data processing and compressing apparatus, comprising:

means for dividing data into a plurality of blocks of data with said blocks of data forming a plurality of input matrices of n by m elements where both n and m are greater than 1;

means for transforming said plurality of input matrices into a respective plurality of vectors with each vector having a number of elements equal to the product of n times m;

data selecting means for selecting one vector out of said plurality of vectors; and means for processing said one vector, said processing means comprising a pair of inner product processing circuits for producing respective inner products of said one vector from respective first and second sets of elements of said one vector, and an adder for adding the inner products to generate an output matrix of n by m elements;

wherein each of said inner product processing circuits comprises a plurality of adder-subtractors, each adder-subtractor receiving a number of the elements of said one vector, the number of the elements of said one vector being less than the product of n times m, and modifying said number of the elements of said one vector according to a matrix of coefficients determined specifically for each of said adder-subtractors and a plurality of multipliers, each multiplier receiving an output from a respective adder-subtractor and multiplying said output with a multiplication coefficient determined specifically for said multiplier, the output of each said multiplier being summed, the sum being provided to said adder; and wherein said image data processing and compressing apparatus is supplied with said plurality of input matrices of n×m elements and generates said output matrix of n×m elements.

3. An image data processing and compressing apparatus as set forth in claim 2, wherein n and m are equal to 8.

4. An image data processing and compressing apparatus as set forth in claim 2, wherein said elements of said input matrices are in a space of spatial frequencies, said elements of said output matrix are in a real space, and said apparatus performs an inverse discrete cosine transform.

5. An image data processing and compressing apparatus as set forth in claim 3, wherein said plurality of blocks comprises four blocks, said plurality of adder-subtractors comprises four adder-subtractors, and said plurality of multipliers comprises four multipliers.

6. An image data processing and compressing apparatus comprising:

a first number of serial-to-parallel converters each having an input for receiving a respective input data string in serial form, each of said serial-to-parallel converters having a predetermined number of outputs for converting each respective input data string to a respective data string that is in parallel form;

data selecting means receiving each respective data string that is in parallel form from each of said serial-to-parallel converters and for outputting only one of the respective data strings received from each of said serial-to-parallel converters; and processing means for receiving the one data string output by said data selecting means and for compressing the one data string output by said data selecting means into an output data string having a number of elements equal to said predetermined number wherein said processing means comprises:

a first set of adder-subtractors each receiving a first set of output data string elements and a second set of adder-subtractors each receiving a second set of output data string elements wherein said first set and said second set of adder-subtractors respectively modify said first set of elements and said second set of elements based upon a plurality of matrices of coefficients with each adder-subtractor being assigned a separate matrix of coefficients;

a plurality of multipliers for respectively receiving outputs from said adder-subtractors and for multiplying said outputs with multiplication coefficients with each multiplier being assigned a separate multiplication coefficient; and means for adding together outputs from each of said multipliers.

7. An image data processing and compressing apparatus comprising:

a first number of serial-to-parallel converters each having an input for receiving a respective input data string in serial form, each of said serial-to-parallel converters having a predetermined number of outputs for converting each respective input data string to a respective data string that is in parallel form;

data selecting means receiving each respective data string that is in parallel form from each of said serial-to-parallel converters and for outputting only one of the respective data strings received from each of said serial-to-parallel converters; and processing means for receiving the one data string output by said data selecting means and for compressing the one data string output by said data selecting means into an output data string having a number of elements equal to said predetermined number wherein said first number is four, said predetermined number is sixty four, and said apparatus performs an inverse discrete cosine transform by receiving at said serial-to-parallel converters said input data strings in a space of spatial frequencies and for outputting with said processing means said output data string in a real space.

8. An image data processing and compressing apparatus, comprising:

a first number of processing means for respectively receiving in serial form first data strings having a first predetermined number of elements with a number of said first data strings being equal to said first number, and for respectively generating in parallel form second data strings each having a second predetermined number of elements, wherein said first predetermined number is greater than said second predetermined number;

data selecting means for receiving said second data strings in a parallel form respectively from said first number of processing means and for successively outputting second data strings received from only one of said processing means;

a plurality of multipliers for receiving second data strings output by said data selecting means and for multiplying each element of said second data strings output by said data selecting means by a multiplication factor determined specifically for each element of said second data strings output by said selecting means; and adding means for adding together outputs from said multipliers and for producing an output data string;

wherein said output data string from said adding means is comprised of a number of elements equal to said first predetermined number.

9. An image data processing and compressing apparatus as set forth in claim 8, wherein each of said processing means comprises:

a calculating block for receiving one of said first data strings and for producing a third data string and a fourth data string wherein both said third data string and said fourth data string have a number of elements equal to said first predetermined number;

a first serial-to-parallel converter for receiving said third data string in serial form and for outputting said third data string in parallel form to a first plurality of data selectors wherein the elements of said third data string are divided equally between said first plurality of data selectors, and a number of said first plurality of data selectors is equal to said first number;

a second serial-to-parallel converter for receiving said fourth data string in serial form and for outputting said fourth data string in parallel form to a second plurality of data selectors wherein the elements of said fourth data string are divided equally between said second plurality of data selectors, and a number of said second plurality of data selectors is equal to said first number;

said first plurality of data selectors selecting elements of said third data string equal in number to said first number; and said second plurality of data selectors selecting elements of said fourth data string equal in number to said first number;

wherein said elements selected by said first plurality of data selectors and said elements selected by said second plurality of data selectors collectively form one of said second data strings.

10. An image data processing and compressing apparatus as set forth in claim 9, wherein said calculating block comprises:

a third serial-to-parallel converter for receiving one of said first data strings in serial form and for outputting said one first data string in parallel form;

a first adder-subtractor for receiving a first set of elements of said one first data string from said third serial-to-parallel converter, for modifying said first set of elements of said one first data string in accordance with a first matrix of coefficients, and for outputting said third data string; and a second adder-subtractor for receiving a second set of elements of said one first data string from said third serial-to-parallel converter, for modifying said second set of elements of said one first data string in accordance with a second matrix of coefficients, and for outputting said fourth data string.

* * * * *